(12) United States Patent
Lawrence et al.

(10) Patent No.: US 10,865,914 B2
(45) Date of Patent: Dec. 15, 2020

(54) HIGH TEMPERATURE LEAK PREVENTION FOR PIPING COMPONENTS AND CONNECTIONS

(71) Applicant: NIBCO INC., Elkhart, IN (US)

(72) Inventors: Benjamin L. Lawrence, Elkhart, IN (US); Richard D. Latham, Granger, IN (US); David A. Bobo, Granger, IN (US); Christopher W. Mason, Granger, IN (US); Ronald Dale Paige, Granger, IN (US)

(73) Assignee: NIBCO INC., Elkhart, IN (US)

( * ) Notice: Subject to any disclaimer, the term of this patent is extended or adjusted under 35 U.S.C. 154(b) by 295 days.

(21) Appl. No.: 15/962,024

(22) Filed: Apr. 25, 2018

(65) Prior Publication Data

US 2018/0313475 A1 Nov. 1, 2018

Related U.S. Application Data

(60) Provisional application No. 62/491,854, filed on Apr. 28, 2017, provisional application No. 62/534,324, filed on Jul. 19, 2017.

(51) Int. Cl.
*F16L 21/03* (2006.01)
*F16L 13/16* (2006.01)
(Continued)

(52) U.S. Cl.
CPC .......... *F16L 13/168* (2013.01); *B21D 39/046* (2013.01); *F16K 41/026* (2013.01);
(Continued)

(58) Field of Classification Search
CPC ........................................................ F16L 21/03
(Continued)

(56) References Cited

U.S. PATENT DOCUMENTS

| 693,830 | A | * | 2/1902 | Burke | ...................... | F16L 13/08 |
| | | | | | | 285/289.1 |
| 796,580 | A | * | 8/1905 | Johnston | .................. | F16L 21/03 |
| | | | | | | 285/231 |

(Continued)

FOREIGN PATENT DOCUMENTS

| CA | 2965907 | 5/2016 |
| DE | 102005043238 A1 | 3/2007 |

(Continued)

OTHER PUBLICATIONS

International Searching Authority, Search Report and Written Opinion for PCT/US2016/058150, dated Feb. 9, 2017, 8 pages, Russia.

(Continued)

*Primary Examiner* — David Bochna
(74) *Attorney, Agent, or Firm* — Price Heneveld LLP

(57) ABSTRACT

A connection socket for a tubular connection that includes: a socket cup having a metal alloy composition and a sealing portion, the sealing portion comprises a primary and a secondary sealing recess; a primary seal positioned within the primary sealing recess, the primary seal comprising an elastomeric material having a service temperature, and a secondary seal positioned within the secondary sealing recess, the secondary seal comprising a metal composition. Further, the secondary seal has a melting temperature at or above the service temperature of the primary seal.

20 Claims, 14 Drawing Sheets

(51) Int. Cl.
*B21D 39/04* (2006.01)
*F16K 41/16* (2006.01)
*F16K 41/04* (2006.01)
*F16L 13/14* (2006.01)
*F16K 41/02* (2006.01)
*F16L 21/02* (2006.01)
*F16L 21/08* (2006.01)
*F16L 21/00* (2006.01)
*F16L 37/244* (2006.01)

(52) U.S. Cl.
CPC ............ *F16K 41/046* (2013.01); *F16K 41/16* (2013.01); *F16L 13/142* (2013.01); *F16L 21/022* (2013.01); *F16L 21/03* (2013.01); *F16L 21/08* (2013.01); *F16L 21/002* (2013.01); *F16L 37/2445* (2013.01)

(58) Field of Classification Search
USPC .............. 285/21.1, 351, 289.5, 296.1, 295.3
See application file for complete search history.

(56) References Cited

U.S. PATENT DOCUMENTS

| | | | | |
|---|---|---|---|---|
| 1,801,171 | A * | 4/1931 | Mueller | F16L 13/08 285/289.5 |
| 2,201,372 | A | 5/1940 | Miller | |
| 2,438,529 | A * | 3/1948 | Woodling | F16L 27/0816 285/281 |
| 2,829,909 | A * | 4/1958 | Magnani | F16L 21/022 285/345 |
| 2,914,347 | A * | 11/1959 | Magnani | F16L 21/022 285/349 |
| 3,149,861 | A | 9/1964 | Larsson | |
| 3,244,441 | A | 4/1966 | Caudle | |
| 3,477,750 | A | 11/1969 | Powell | |
| 3,596,939 | A | 8/1971 | Gibson | |
| 3,600,010 | A * | 8/1971 | Downs, III | F16L 17/10 285/96 |
| 3,632,141 | A * | 1/1972 | Larsson | F16L 13/142 285/24 |
| 3,675,949 | A | 7/1972 | Dawson | |
| 3,960,394 | A * | 6/1976 | Hubner | F16L 47/02 285/296.1 |
| 4,018,462 | A | 4/1977 | Saka | |
| 4,130,302 | A * | 12/1978 | Mitchell | F16L 13/142 285/113 |
| 4,150,466 | A | 4/1979 | Horvath | |
| 4,249,340 | A | 2/1981 | Maes, Jr. | |
| 4,277,091 | A | 7/1981 | Hunter | |
| 4,328,982 | A | 5/1982 | Christianson | |
| 4,647,080 | A * | 3/1987 | Sandt | F16L 13/11 285/296.1 |
| 4,850,096 | A | 7/1989 | Gotoh | |
| 4,880,260 | A | 11/1989 | Gotoh | |
| 4,964,657 | A | 10/1990 | Gonzales | |
| 5,007,667 | A | 4/1991 | Unewisse | |
| 5,080,406 | A | 1/1992 | Hyatt et al. | |
| 5,108,134 | A | 4/1992 | Irwin | |
| 5,150,519 | A | 9/1992 | Unewisse | |
| 5,484,174 | A | 1/1996 | Gotoh | |
| 5,590,914 | A | 1/1997 | Platner | |
| 5,607,193 | A | 3/1997 | Guest | |
| 5,685,577 | A * | 11/1997 | Vanesky | B29C 66/5221 156/295 |
| 5,722,702 | A * | 3/1998 | Washburn | F16L 21/08 285/322 |
| 5,845,945 | A * | 12/1998 | Carstensen | F16L 1/18 285/321 |
| 5,918,914 | A * | 7/1999 | Morris | F16L 17/02 285/351 |
| 6,059,338 | A | 5/2000 | Diederichs | |
| 6,131,956 | A | 10/2000 | Foering | |
| 6,224,114 | B1 | 5/2001 | Franzen | |
| 6,241,290 | B1 | 6/2001 | Foering | |
| 6,409,175 | B1 * | 6/2002 | Evans | E21B 17/042 277/314 |
| 6,581,983 | B1 | 6/2003 | Viegener | |
| 6,619,701 | B1 | 9/2003 | Udhofer | |
| 6,695,012 | B1 * | 2/2004 | Ring | E21B 43/106 138/98 |
| 6,805,385 | B2 | 10/2004 | Viegener | |
| 6,874,823 | B2 | 4/2005 | Viegener | |
| 6,976,712 | B2 * | 12/2005 | Lukach, Jr. | F16L 21/06 285/351 |
| 7,201,382 | B2 | 4/2007 | Viegener | |
| 7,316,429 | B2 | 1/2008 | Viegener | |
| 7,658,419 | B2 | 2/2010 | Viegener | |
| 7,954,861 | B2 | 6/2011 | Swift et al. | |
| 8,533,926 | B2 | 9/2013 | Holmes, IV | |
| 8,585,100 | B2 | 11/2013 | Stults | |
| 8,925,176 | B2 * | 1/2015 | Choi | F16L 19/086 29/464 |
| 9,145,992 | B2 | 9/2015 | Arment et al. | |
| 9,249,907 | B2 | 2/2016 | Mester | |
| 9,638,361 | B2 | 5/2017 | Arment et al. | |
| 2005/0248152 | A1 | 11/2005 | Viegener | |
| 2007/0096465 | A1 | 5/2007 | Hall | |
| 2009/0021001 | A1 | 1/2009 | Oh | |
| 2011/0204624 | A1 | 8/2011 | Lawrence | |
| 2012/0043752 | A1 * | 2/2012 | McPherson | B29C 65/542 285/21.1 |
| 2013/0187380 | A1 * | 7/2013 | Leggett | F16L 21/03 285/351 |
| 2014/0021719 | A1 | 1/2014 | Salehi-Bakhtiari | |
| 2014/0197633 | A1 | 7/2014 | Nixon et al. | |
| 2015/0345683 | A1 | 12/2015 | Crompton | |
| 2017/0234464 | A1 * | 8/2017 | Lawrence | F16L 13/142 285/382 |

FOREIGN PATENT DOCUMENTS

| | | |
|---|---|---|
| GB | 511527 | 8/1939 |
| JP | 569025 | 1/1981 |
| JP | 569026 | 1/1981 |
| WO | 2011025768 | 3/2011 |

OTHER PUBLICATIONS

Canadian Search Report for Canadian Application No. 3,002,974, dated May 6, 2020, 3 pages.

* cited by examiner

HIGH TEMPERATURE LEAK PREVENTION FOR PIPING COMPONENTS AND CONNECTIONS

CROSS-REFERENCE TO RELATED APPLICATIONS

This patent application claims priority under 35 U.S.C. § 119(e) to U.S. Provisional Patent Application No. 62/491,854, entitled "HIGH TEMPERATURE LEAK PREVENTION FOR MECHANICAL JOINED PIPING," filed Apr. 28, 2017, and U.S. Provisional Patent Application No. 62/534,324, entitled "HIGH TEMPERATURE LEAK PREVENTION FOR PIPING COMPONENTS AND CONNECTIONS," filed Jul. 19, 2017, the entire disclosures of which are incorporated herein by reference.

FIELD

The present disclosure generally relates to connection sockets for tubular connections with high temperature leak reliability, more particularly, for piping components and connections with high temperature leak reliability made from a wide range of alloys including ferrous alloys, copper-based alloys and nickel-based alloys.

BACKGROUND

Over the years, the plumbing industry has witnessed a remarkable increase in the use of mechanical joinery systems as alternatives to traditional threaded connections (e.g., as-manufactured fittings with threaded ends joined by threading) and thermal connections (e.g., connections made by brazing, soldering and/or welding). Further, within the general family of mechanical joinery, 'press' and 'push' joint connections, as understood by those in the field of this disclosure, are finding use in or are being considered for gas line service. The most common sealing device for these types of connections is a form of elastomeric (rubber) O-ring.

These O-rings are designed and formulated to retain a high degree of compressive durability and sealing capability within a specific temperature range. The choice of a particular O-ring material is based on the expected operational temperature of a given service. More particularly, the high temperature limit or service temperature for most commercial "rubber" O-rings is below 500° F. (260° C.). Silicone rubbers, for example, hold the high end of this temperature stability range, roughly from about 400-500° F. (204-260° C.) with transient thermal stability approaching 600° F. (333° C.). Other O-rings, such as those fabricated from polytetrafluoroethylene (PTFE) material or nitride rubber, have been formulated and/or blended for thermal stability at temperatures approaching 600° F. (333° C.).

What is not typically factored in during O-ring material selection is extreme temperature exposure well beyond the upper service limit of conventional O-ring materials, e.g., O-ring thermal stability for temperatures exceeding 600° F. (333° C.). Taken together, the increased interest and acceptance of gas line mechanical joinery, along with the inherent high temperature limits of conventional O-ring materials, causes uncertainty with respect to the fire-related safety of 'press' and 'push' mechanical joinery. In an attempt to address this concern, the mechanical joinery industry has adopted new high-temperature testing protocols to validate gas service with 'press' and 'push' mechanical joinery. These protocols can include verification of short-term survivability of the tubular connection during and after exposure to a temperature of 1,000° F. for 2 hours.

Accordingly, there is a need for connection sockets for tubular connections (e.g., 'press' and 'push' connections) and piping components (e.g., valve assemblies) with high temperature leak reliability, including short-term reliability during extreme temperature exposures. There is also a need for connection sockets for tubular connections and piping components with less risk of failure during assembly and in service.

SUMMARY OF THE DISCLOSURE

According to an aspect of the present disclosure, a connection socket for a tubular connection is provided that includes: a socket cup having a metal alloy composition and a sealing portion, the sealing portion comprises a primary and a secondary sealing recess; a primary seal positioned within the primary sealing recess, the primary seal comprising an elastomeric material having a service temperature; and a secondary seal positioned within the secondary sealing recess, the secondary seal comprising a metal composition. Further, the secondary seal has a melting temperature at or above the service temperature of the primary seal.

According to another aspect of the present disclosure, a connection socket for a tubular connection is provided that includes: a socket cup having a metal alloy composition and a sealing portion, the sealing portion comprises a primary, a secondary and a tertiary sealing recess; a primary seal positioned within the primary sealing recess, the primary seal comprising an elastomeric material having a service temperature; a secondary seal positioned within the secondary sealing recess, the secondary seal comprising a first metal composition; and a tertiary seal positioned within the tertiary sealing recess, the tertiary seal comprising a second metal composition. The first and second metal compositions of the respective secondary and tertiary seals differ. Further, each of the secondary seal and tertiary seals has a melting temperature at or above the service temperature of the primary seal.

According to a further aspect of the disclosure, a tubular connection is provided that includes: a socket cup having a metal alloy composition and a sealing portion, the sealing portion comprises a primary and a secondary sealing recess; a primary seal positioned within the primary sealing recess, the primary seal comprising an elastomeric material having a service temperature; a secondary seal positioned within the secondary sealing recess, the secondary seal comprising a metal composition; and a pipe having a metal alloy composition and comprising a pipe end in contact with the primary and secondary seals. The secondary seal has a melting temperature at or above the service temperature of the primary seal. Further, the pipe end in contact with the seals defines a barrier to media flowing through the pipe.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
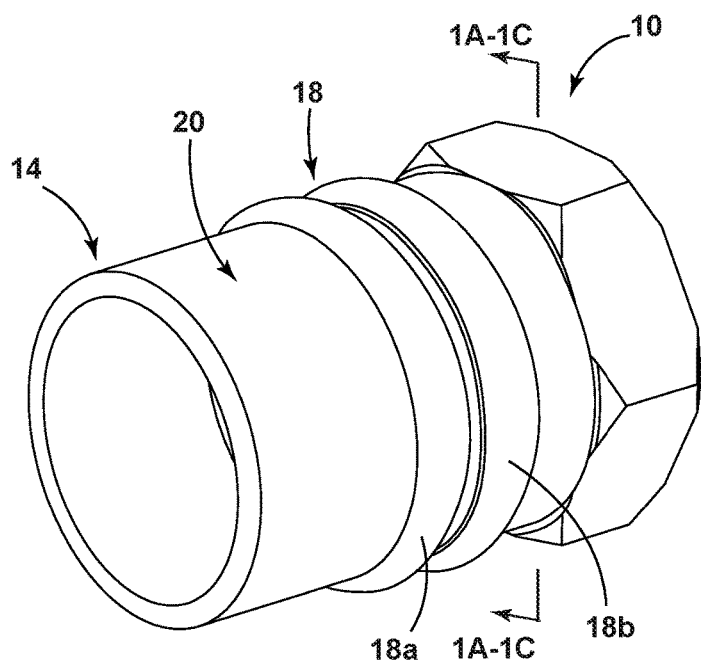
FIG. 1 is a perspective view of a connection socket with a secondary high-temperature seal, according to an embodiment.
Figure 1A:
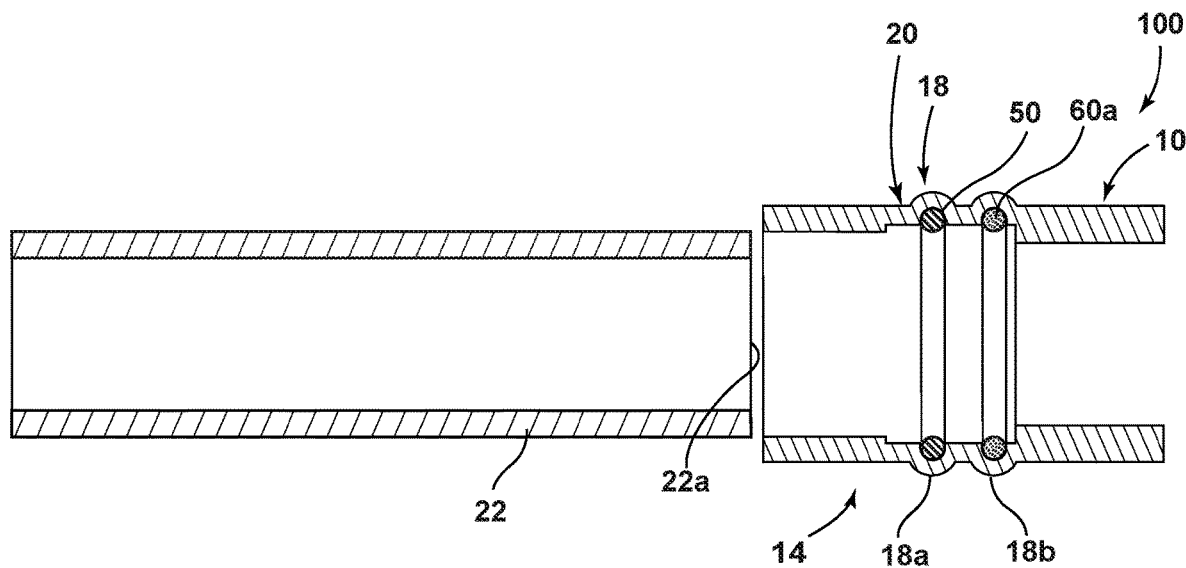
FIG. 1A is a cross-sectional view of the connection socket depicted in FIG. 1 and a pipe in a spaced apart configuration, according to an embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5B, the mechanical joinery of the disclosure, including piping components, connection sockets and tubular connections, offer a unique safety feature that allows for short-term leak protection of a seal during an extreme temperature exposure. For example, the mechanical joinery of the disclosure can be employed in a gas line to provide such protection during a catastrophic fire event. The disclosure applies to connection sockets and piping components that contain at least one elastomeric seal (i.e., an O-ring or O-rings) as the primary means of leak prevention. High temperature survivability of these seals becomes an issue in gas service where an immediate compounded threat is posed by a gas line breach during a fire event, which if not controlled, can result in an explosion. Advantageously, the connection sockets, piping components and tubular connections of the disclosure are also configured with at least one secondary seal that becomes active (e.g., it flows and/or wicks within the connection) and serves as a temporary seal in the event of a fire or other extreme temperature event, taking over for or acting in synergy with the failed O-ring. The additional time offered by the components of the disclosure prior to seal failure from the high temperature event can be crucial to the safety of individuals in proximity to the event that caused the high temperature event (e.g., a fire).

Figure 1B:
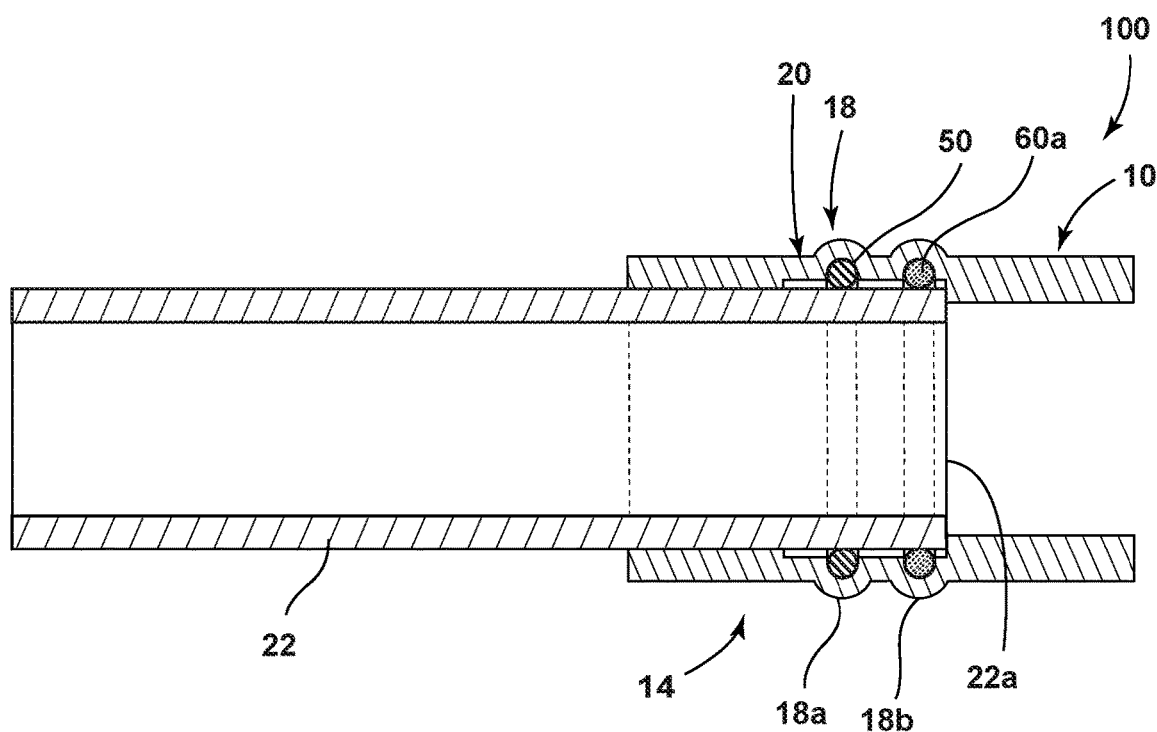
FIG. 1B is a cross-sectional view of the connection socket and pipe depicted in FIG. 1A, arranged together in a tubular connection according to an embodiment.

Referring to FIGS. 1-1B, a tubular connection 100 is depicted that includes a connection socket 10 (see FIG. 1). The connection socket 10 includes a socket cup 14, in some embodiments, fabricated from a metal alloy composition. The socket cup 14 includes a sealing portion 18 that defines a primary sealing recess 18a and a secondary sealing recess 18b. In some aspects, the primary and secondary sealing recesses 18a, 18b have a substantially circular, rectangular, square or triangular cross-section. According to some aspects, the primary and secondary sealing recesses 18a, 18b have substantially the same cross-sectional diameter, widths or comparable dimension. In other implementations, the primary and secondary sealing recesses 18a, 18b have differing cross-sectional diameters, widths or comparable dimensions. Further, according to some embodiments, the primary and secondary sealing recesses 18a, 18b are spaced from one another by at least cross-sectional diameter, width or comparable dimension of the recesses 18a, 18b.

Referring again to the tubular connection 100 and connection socket 10 depicted in FIGS. 1-1B, the tubular connection 100 includes one or more primary seals 50 (e.g., O-rings) positioned in the primary sealing recess 18a; and a pipe 22 (e.g., a tube, a pipe or other cylindrical conveyance structure) having a metal alloy composition. Further, the pipe 22 includes a pipe end 22a in contact with the one or more primary seals 50. In addition, the one or more primary seals 50 and the pipe end 22a define a primary sealing connection between the pipe 22 and the socket cup 14 (e.g., as shown in FIG. 1B).

Referring again to FIGS. 1-1B, the primary seal(s) 50 of the tubular connection 100 and connection socket 10 are fabricated from a polymeric material, preferably an elastomeric material, suitable for use in the application as understood by those with ordinary skill in the field of the disclosure. In embodiments, the primary seal(s) 50 positioned in the primary sealing recess 18a (or recesses 18a) can be fabricated from elastomeric materials, such as an ethylene propylene diene monomer (EPDM). In other implementations, the primary seal 50 comprises an elastomeric material selected from the group consisting of a silicone rubber, a nitrile rubber, an ethylene propylene diene monomer (EPDM) rubber, a fluorocarbon-based rubber, a fluorosilicone rubber, and a polytetrafluoroethylene (PTFE) material. More generally, the primary seal(s) 50 are fabricated from a polymeric material with a maximum service temperature of about 400° F. (about 204° C.) or less, 350° F. (about 177° C.) or less in some embodiments, or 300° F. (about 149° C.) or less in other embodiments. As used herein, the "service temperature" is defined such that as the primary seal(s) 50 are exposed to temperatures at or above the service temperature, the seal begins to degrade (e.g., via combustion, oxidation or other process resulting in weight loss to the seal) to an extent in which any sealing afforded by the primary seal 50 in the primary sealing recess 18a, e.g., to a pipe 22, begins to fail (e.g., as evidenced by a pressure loss of at least 10% associated with any media in the connection socket 10 and/or tubular connection 100).

Still referring to FIGS. 1-1B, the connection socket 10 and the tubular connection 100 are further configured such that a secondary seal 60a is positioned within the secondary sealing recess 18b. Further, the secondary seal 60a is fabricated from a metal composition (e.g., a solder alloy, brazing alloy, other metal alloy, etc.). In some embodiments, the secondary seal 60a is configured as a ring with a round or rectangular cross-section. More generally, the secondary seal 60a is fabricated from a composition that has a melting temperature that resides at or above the service temperature of the primary seal 50. In embodiments, the secondary seal 60a is fabricated from a material with a melting temperature that exceeds the service temperature of the primary seal 50 by about 50° C., about 100° C., about 150° C., about 200° C. or more. In other embodiments, the secondary seal may be made from a metal alloy having a softening or melting temperature between about 600° F. (about 316° C.) and about 1000° F. (about 538° C.). In at least one example, the secondary seal 60a is fabricated from a standard lead-free 95-5 solder with a melting range of about 450° F. (about 232° C.) to about 464° F. (about 240° C.).

Figure 1C:
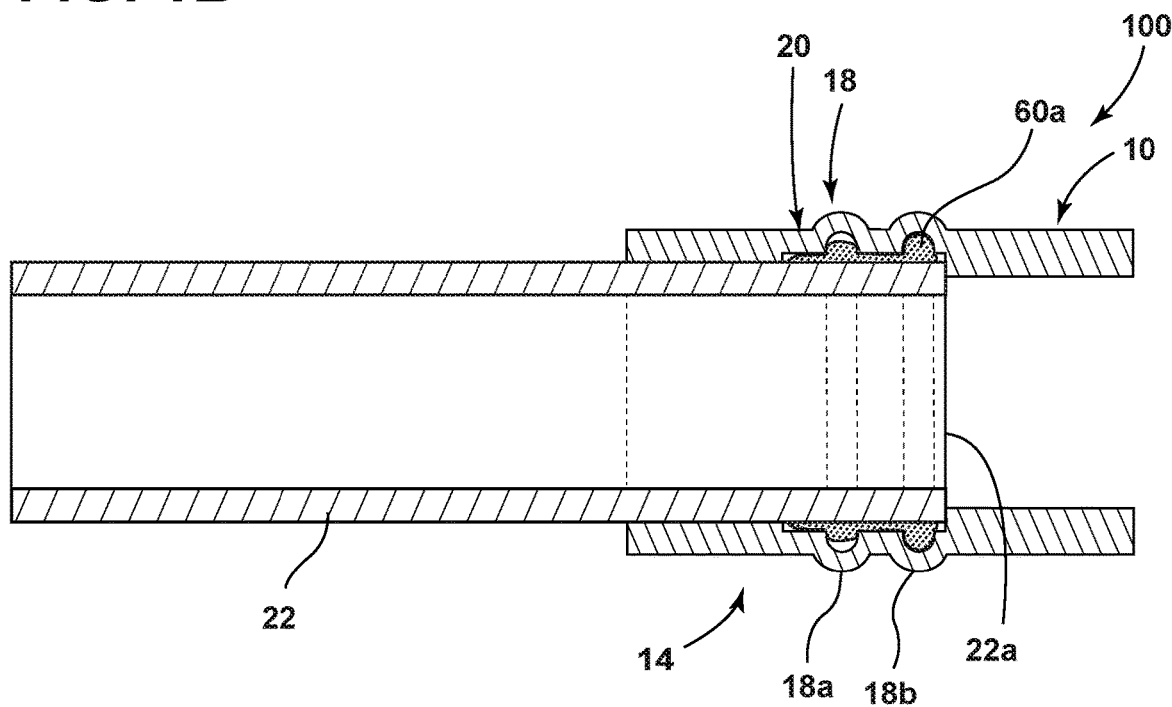
FIG. 1C is a cross-sectional view of the connection socket and pipe depicted in FIG. 1A, arranged together in a tubular connection with an as-wicked, secondary high-temperature seal, according to an embodiment.

Referring now to FIGS. 1B and 1C, the connection socket 10 and tubular connection 100 are advantageously configured to allow for short-term leak protection during a high temperature or otherwise extreme temperature exposure. As noted earlier, the connection socket 10 and tubular connection 100 are configured with at least one secondary seal 60a (e.g., as positioned in the secondary sealing recess 18b) that becomes active and serves as a temporary seal in the event of a fire or other extreme temperature event, taking over for or acting in synergy with a failed primary seal 50 (e.g., as positioned in the primary sealing recess 18a). As the primary seal 50 (see FIG. 1B) degrades or otherwise fails from exposure to temperatures at or above its service temperature, the secondary seal 60a, which is fabricated from a metal composition that melts at or above the service temperature of the primary seal 50, can begin to melt, flow, and/or wick. Upon flow and/or melting, the secondary seal 60a can flow into the primary sealing recess 18a, the secondary sealing recess 18b, and/or the gap between the outer diameter of the pipe 22 and the inner surface of the socket cup 14, as shown in FIG. 1C. Flow of the secondary seal 60a is facilitated by both capillary action afforded by the gap between the outer diameter of the pipe 22 and the inner surface of the socket cup 14, along with applied pressure from the media (e.g., gas) flowing within the pipe 22.

Referring again to FIG. 1C, the ability of the secondary seal 60a in the connection socket 10 and tubular connection 100 to perform as a high-temperature seal can be dictated by the heat sensitivity or survivability of the primary seal 50, with lower maximum temperature primary seals 50 requiring lower melting point secondary seals 60a (e.g., fusible alloys or solders). The ability of the secondary seal 60a to function as a high-temperature seal can also be influenced by the connection spacing between the primary seal 50 and the secondary seal 60a. That is, the gap formed between the parallel surfaces of the outside diameter of the pipe 22 and the inner surface of the socket cup 14 must be within a range that allows for capillary flow of molten alloy (liquid or semi-liquid) from the secondary seal 60a. The ability of the secondary seal 60a to function as a high-temperature seal may also be influenced by the melt range of the secondary seal 60a (e.g., as framed by the solidus and liquidus temperatures of metallic examples). Accordingly, the composition of the secondary seal 60a can be selected based upon the target temperature of the secondary seal 60a at which it should flow to provide a secondary seal upon failure of the primary seal 50. That is, the composition of the secondary seal 60a can be selected such that the high temperature target associated with failure of the primary seal 50 falls within the semi-solid phase of the secondary seal 60a.

In some embodiments of the connection socket 10 and tubular connection 100 depicted in FIGS. 1-1B, the primary and secondary sealing recesses 18a, 18b are configured such that the secondary seal 60a is positioned upstream of the primary seal 50 (i.e., closer to the pipe end 22a as shown in FIG. 1B). In other embodiments (not shown), the primary and secondary sealing recesses 18a, 18b can be configured such that the secondary seal 60a is positioned downstream of the primary seal 50.

As noted earlier, reference numerals 100 and 10 are generally directed to a tubular connection and connection socket, respectively, as shown in FIGS. 1-1B. The connection socket 10, as employed by the tubular connection 100, may be configured to facilitate the joining of one or more pipes 22 to enable the transfer of a fluid (e.g., gas and/or liquids) between the pipes 22 without leakage. Further, the connection socket 10 may be sealed and used to terminate or otherwise cap a pipe 22. Still further, those with ordinary skill in the art can appreciate that the connection socket 10 may be configured as a valve (see also FIGS. 3-3B, outlined later in this disclosure) with the features outlined earlier with regard to the connection socket 10 (e.g., with a primary sealing recess 18a, primary seal(s) 50, etc.).

Referring again to FIGS. 1-1B, the sealing portion 18 may define one or more primary sealing recesses 18a. According to some embodiments, the sealing portion 18 defines two or more primary sealing recesses 18a (not shown). The primary sealing recesses 18a are configured to hold, or seat, one or more primary seals 50 (e.g., O-ring(s)). Use of the primary sealing recesses 18a allows for the connection socket 10 to resist migration of the primary seals 50 during and after the connection socket 10 is joined to a pipe 22. The connection socket 10 can be configured to accept the insertion of the pipe 22 into the socket cup 14.

During formation of the tubular connection 100 (see FIG. 1B), the seal formed by the primary seal 50, the inner surface of the socket cup 14 and the outer surface of the pipe 22 can be prone to uneven compression and/or displacement of the primary seal 50. That is, a press-fit jaw, e.g., as configured with a smooth cylindrical or a hex-contact surface "clamshell", can tend to cause the primary seal 50 to "bunch-up" in forming the seal between the inner surface of the socket cup 14 and the outer surface of the pipe 22. As a consequence, the uneven distribution of primary seal 50 material may not produce a leak under ambient pressure testing, but can result in earlier leaking under high temperature testing and/or exposure (e.g., at lower temperatures than would be expected if the primary seal 50 was more evenly distributed). Indeed, as testing has shown, the consistent location of eventual leaks during high-temperature testing and/or exposure is the point of last jaw closure from a press-fit tool. Accordingly, the jaws of a press-fit tool can more evenly distribute forces around the circumference of the socket cup 14. The result is that the primary seal 50 has a more even distribution within its seal with the inner surface of the socket cup 14 and the outer surface of the pipe 22.

Figure 2:
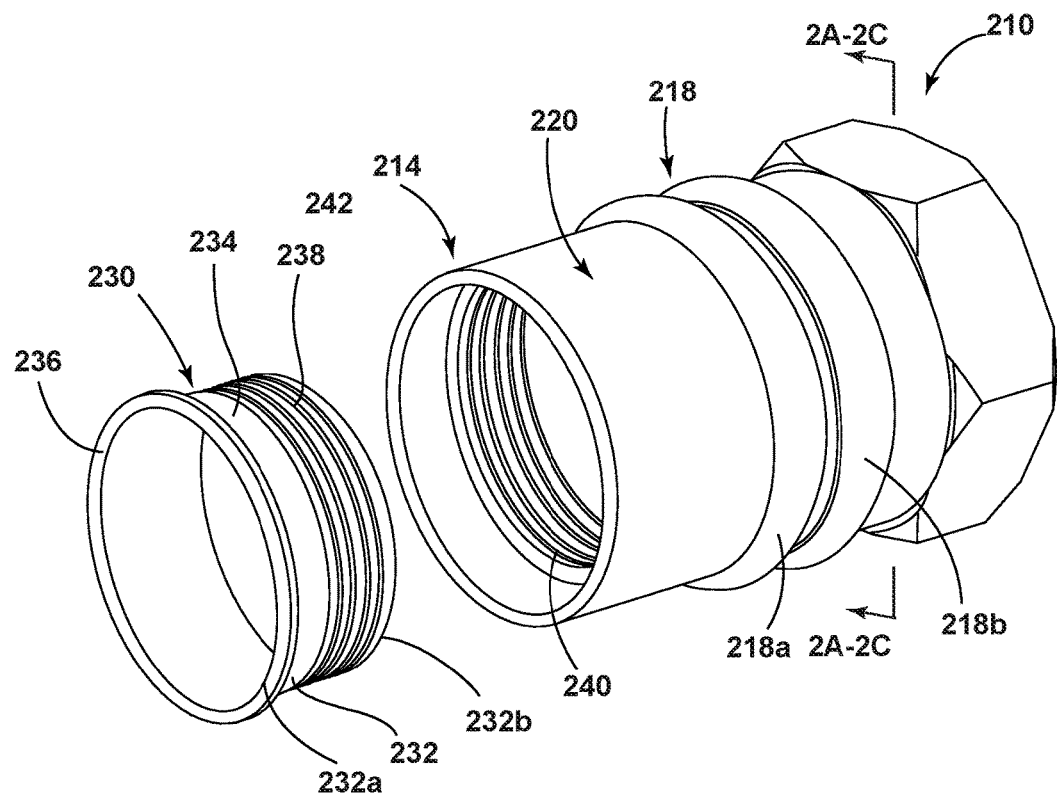
FIG. 2 is a perspective view of a connection socket with a secondary high-temperature seal and a threaded support ring, according to an embodiment.
Figure 2A:
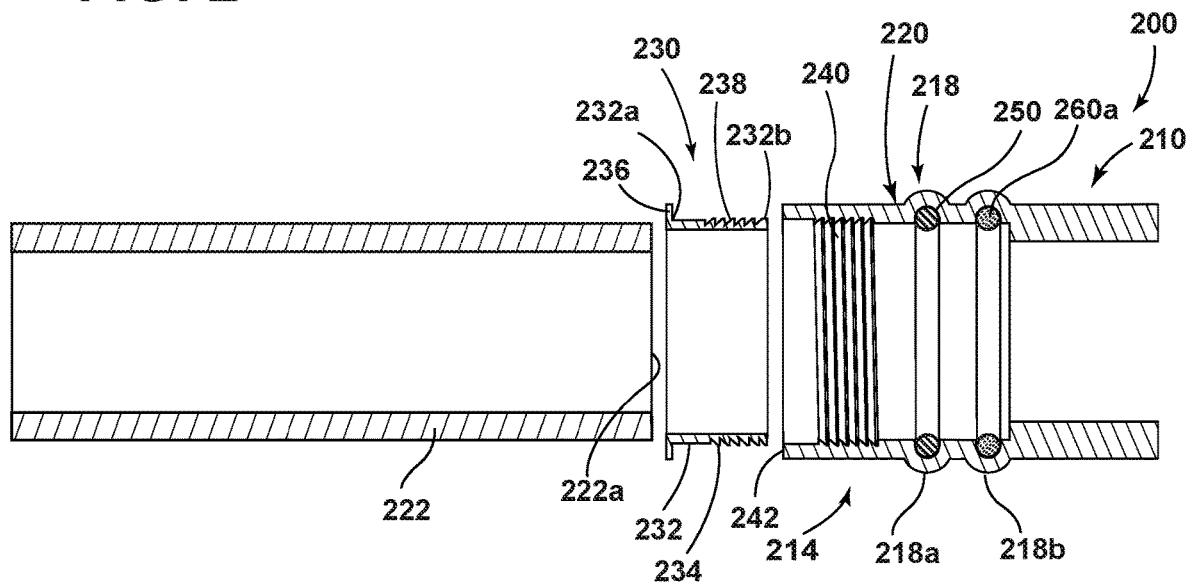
FIG. 2A is a cross-sectional view of the connection socket and threaded support ring depicted in FIG. 2 and a pipe in a spaced apart configuration, according to an embodiment.
Figure 2B:
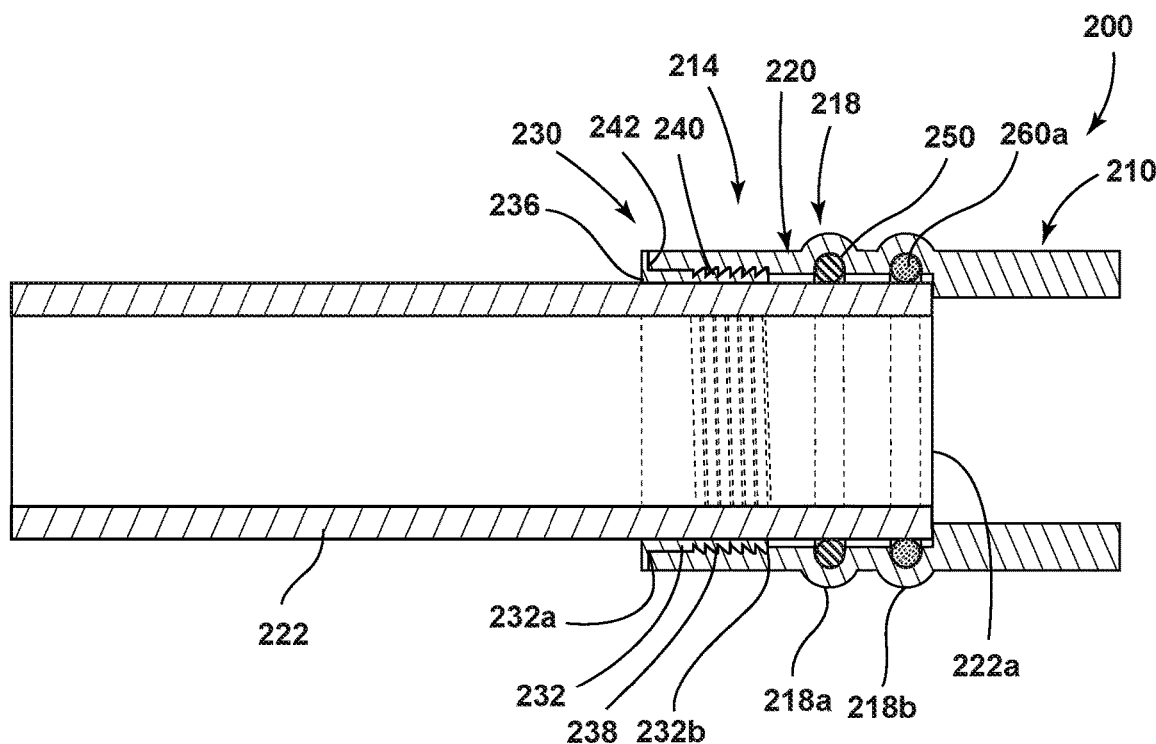
FIG. 2B is a cross-sectional view of the connection socket, threaded support ring, and pipe depicted in FIG. 2A, arranged together in a tubular connection, according to an embodiment.
Figure 2C:
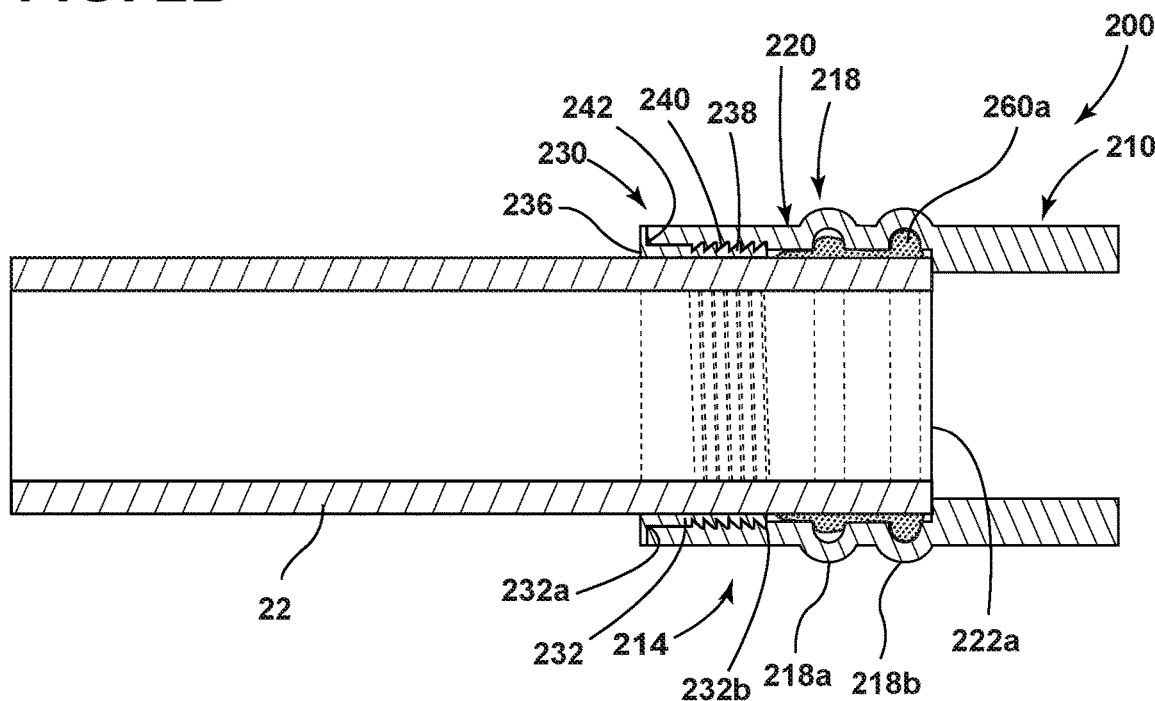
FIG. 2C is a cross-sectional view of the connection socket, threaded support ring, and pipe depicted in FIG. 2A, arranged together in a tubular connection with an as-wicked, secondary high-temperature seal, according to an embodiment.

Referring now to FIGS. 2-2C, a connection socket 210 is depicted that can be employed in a tubular connection 200, according to a modified embodiment of the tubular connection 100 of FIGS. 1-1C. Connection socket 210 and tubular connection 200 are similar to the connection socket 10 and tubular connection 100 (see FIGS. 1-1C), respectively, and like-numbered elements have the same or substantially similar functions and structures. The primary difference between the connection sockets and tubular connections is that the sockets 210 and connections 200 additionally employ a threaded support ring 230 positioned within a socket cup 214 and downstream of primary and secondary sealing recesses 218a and 218b. As depicted in a first exemplary form in FIGS. 2-2C, the connection socket 210 for a tubular connection 200 includes: the socket cup 214 having a metal alloy composition and a sealing portion 218. Further, the sealing portion 218 includes a primary sealing recess 218a and a secondary sealing recess 218b. The sealing portion 218 also includes a primary seal 250 positioned within the primary sealing recess 218a, the primary seal 250 comprising an elastomeric material having a service temperature. In addition, the sealing portion 218 includes a secondary seal 260a positioned within the secondary sealing recess 218b, the secondary seal 260a comprising a first metal composition. Further, the secondary seal 260a has a melting temperature at or above the service temperature of the primary seal 250.

Referring again to FIGS. 2-2C, the support ring 230 of the socket 210 and tubular connection 200 is configured to be received by the socket cup 214. The support ring 230 includes a body 232 having a first end 232a, a second end 232b, and an outer surface 234. A ring lip 236 extends outwardly the first end 232a of the body 232. In the illustrated embodiment, the outer surface 234 of the support ring 230 includes exterior threading 238 extending from the second end 232b a predetermined distance towards the first end 232a. The exterior threading 238 is configured to mate with interior threading 240 within the socket cup 214. When the exterior threading 238 is mated with the interior threading 240, the ring lip 236 sits flush with an outer lip 242 of the socket cup 214, as shown in FIG. 2B. The ring lip 236 may include machined grooves to allow for loose tightening of the support ring 230. The support ring 230 may be formed of a metal alloy, such as, for example, steel.

When the tubular connection 200 is pressed, the pressing force can be distributed unevenly around the connection socket 210. Without the benefit of the support ring 230, this uneven distribution can cause failure of the connection socket 210 at installation. Additionally, without the support ring 230, the high pressure associated with the application (e.g., the flow of gaseous media) may cause "hoop stress" and slippage of the connection components. The support ring 230 provides resistance to hoop stress, preventing fracturing of the connection socket 210. The support ring 230 also provides resistance to slippage induced by high pressure, preventing the inserted tube 222 from separating from the connection socket 210. The first exemplary embodiment of the support ring 230 provides resistance to slippage by gripping with the threading 238, 240 to prevent separation. Additionally, after the tubular connection 200 is pressed during the assembly, the support ring 230 continues to prevent leakage from the sealing portion 218. In the event that the tubular connection 200 experiences temperatures at or above the service temperature of the primary seal 250, the secondary seal 260a can begin to melt and flow. The second end 232b of the support ring 230 provides a barrier preventing the secondary seal from flowing too far past the primary sealing recess 218a. It will also be understood that the body 232 of the support ring 230 may be altered to increase drag against the inserted tube 222. These alterations may include, for example, knurling, light threading, machined barbs, or any combination thereof.

Figure 3:
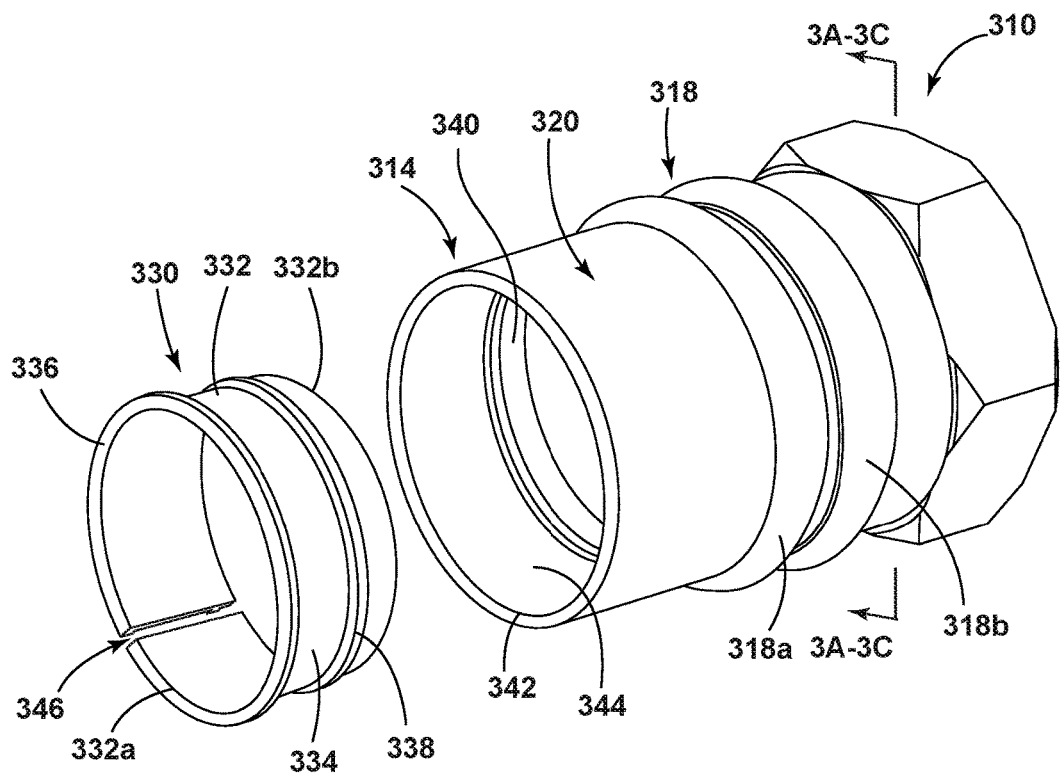
FIG. 3 is a perspective view of a connection socket with a secondary high-temperature seal and a split support ring, according to an embodiment.
Figure 3A:
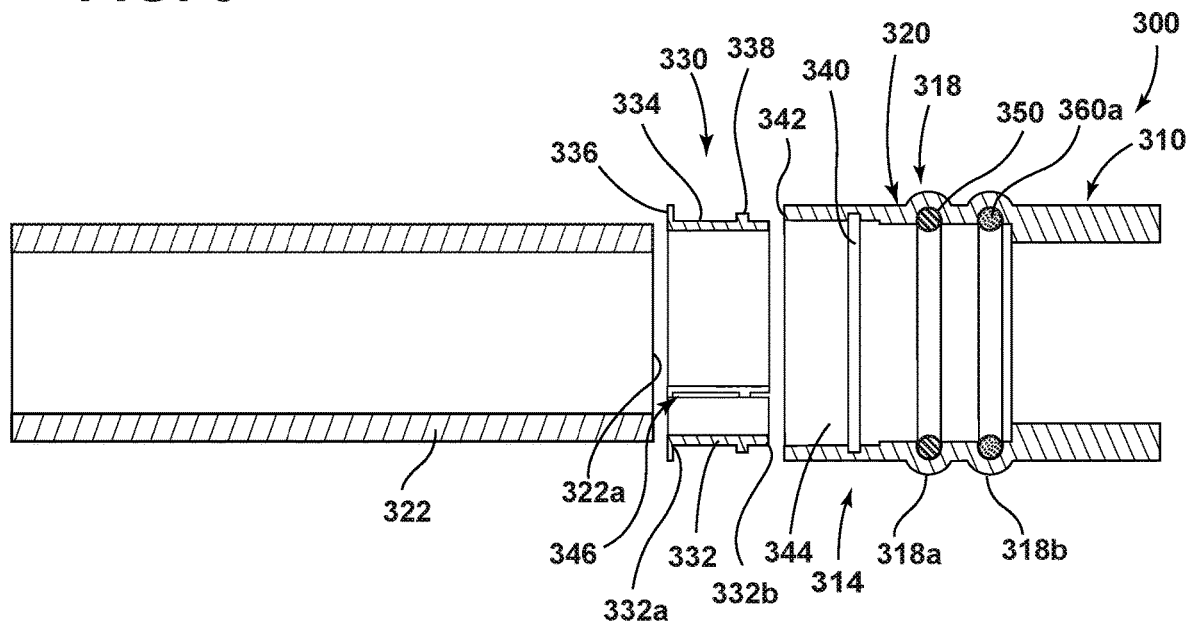
FIG. 3A is a cross-sectional view of the connection socket and split support ring depicted in FIG. 3 and a pipe in a spaced apart configuration, according to an embodiment.
Figure 3B:
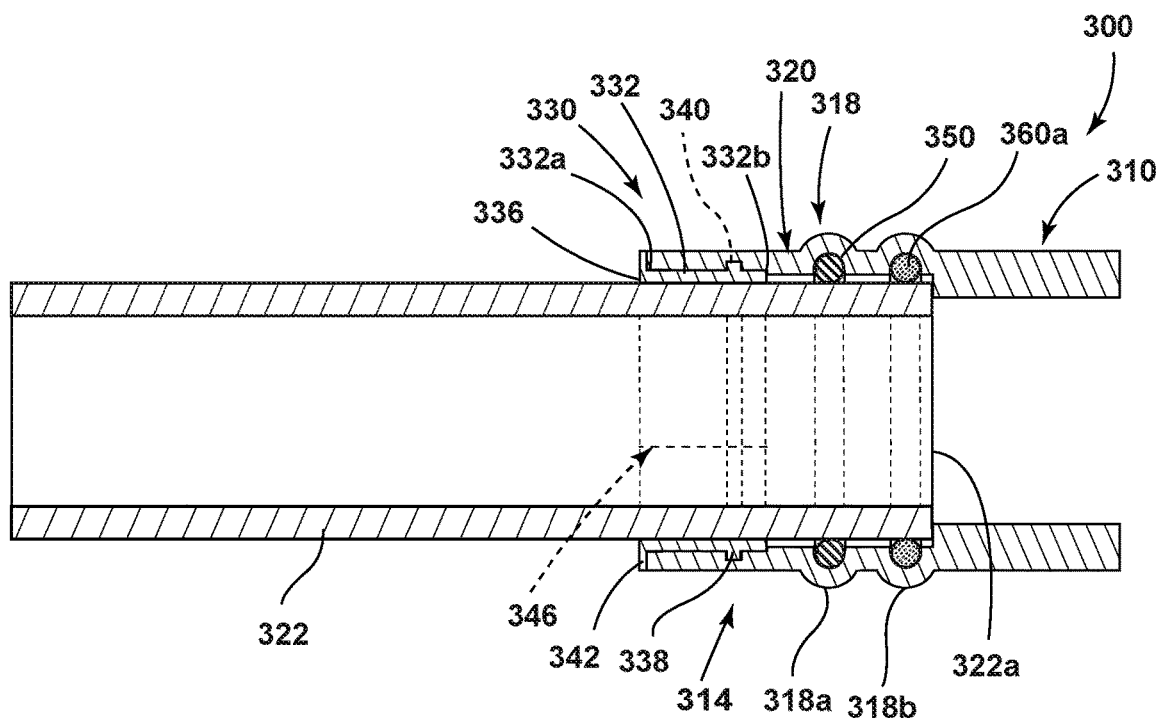
FIG. 3B is a cross-sectional view of the connection socket, split support ring, and pipe depicted in FIG. 3A, arranged together in a tubular connection, according to an embodiment.
Figure 3C:
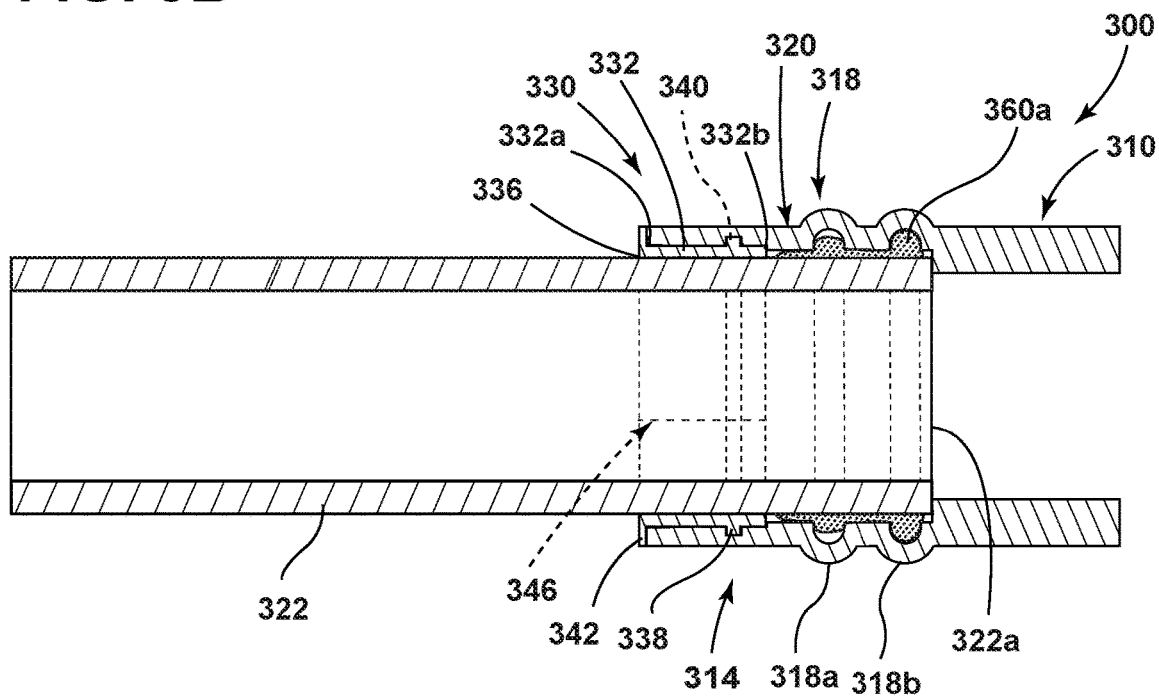
FIG. 3C is a cross-sectional view of the connection socket, split support ring, and pipe depicted in FIG. 3A, arranged together in a tubular connection with an as-wicked, secondary high-temperature seal, according to an embodiment.

Referring now to FIGS. 3-3C, a connection socket 310 is depicted that can be employed in a tubular connection 300, according to a modified embodiment of the tubular connection 100 of FIGS. 1-1C. Connection socket 310 and tubular connection 300 are similar to the connection socket 10 and tubular connection 100 (see FIGS. 1-1C), respectively, and like-numbered elements have the same or substantially similar functions and structures. The primary difference between the connection sockets and tubular connections is that the sockets 310 and connections 300 additionally employ a split support ring 330 positioned within a socket cup 314 and downstream of primary and secondary sealing recesses 318a and 318b. As depicted in a first exemplary form in FIGS. 3-3C, the connection socket 310 for a tubular connection 300 includes: the socket cup 314 having a metal alloy composition and a sealing portion 318. In addition, the sealing portion 318 includes a primary sealing recess 318a and a secondary sealing recess 318b. The sealing portion 318 also includes a primary seal 350 positioned within the primary sealing recess 318a, the primary seal 350 comprising an elastomeric material having a service temperature. Further, the sealing portion 318 includes a secondary seal 360a positioned within the secondary sealing recess 318b, the secondary seal 360a comprising a first metal composition. Further, the secondary seal 360a has a melting temperature at or above the service temperature of the primary seal 350.

Referring again to FIGS. 3-3C, the support ring 330 of the socket 310 and tubular connection 300 is configured to be received by the socket cup 314. The support ring 330 includes a body 332 having a first end 332a, a second end 332b, and an outer surface 334. A lip 336 extends outwardly from the first end 332a of the body 332. A protrusion 338 extends about the circumference of the body 332 and may be positioned on any part of the body 332 located between the first end 332a and the second end 332b. The protrusion 338 is of a predetermined height and thickness, and the predetermined height and thickness may be any height or thickness receivable by the socket cup 314 without departing from the scope of the present invention. The protrusion 338 is configured to be received by a channel 340 defined by an inner surface 344 of the socket cup 314. It is contemplated that the protrusion 338 may have any cross-section including, for example, trapezoidal, pentagonal, rectangular, triangular, etc. It will be understood that the shape of the channel 340 is determined by the cross-section of the protrusion 338. It is further contemplated that the protrusion 338 may include tapered edges and/or may extend any length along the body 332 of the support ring 330 without departing from the scope of the present disclosure.

The support ring 330 of the second exemplary form is a split support ring and includes a split 346 defined by the body 332 and extending from the lip 336 and the first side 332a to the second side 332b. When the support ring 330 is received by the socket cup 314, the support ring 330 is compressed circumferentially to close the split 346. The support ring 330 may then be inserted into the socket cup 314, where the compression is released and the protrusion 338 is received by the channel 340. When the protrusion is received by the channel 340, the lip 336 sits flush with an outer lip 342 of the socket cup 314, as shown in FIG. 3B. The support ring 330 may be formed of a metal alloy, such as, for example, steel.

As previously discussed, when the tubular connection 300 is pressed during assembly, the force can be distributed unevenly around the connection socket 310. Without the benefit of the support ring 330, this uneven distribution can cause failure of the connection socket 310 at installation. Additionally, without the support ring 330, the high pressure associated with the application (e.g. the flow of gaseous media) may cause "hoop stress" and slippage of the connection components. The support ring 330 provides resistance to hoop stress, preventing fracturing of the connection socket 310. The support ring 330 also provides resistance to slippage induced by high pressure, preventing the inserted tube 322 from separating from the connection socket 310. The second exemplary embodiment of the support ring 330 provides resistance to slippage by using the protrusion 338 in the channel 340 to provide a gripping surface. It is also further contemplated that the body 332 of the support ring 330 may be of a predetermined length to position the second side 332b of the body 332 of the support ring 330 directly beneath the area of the connection socket 310 configured to be pressed by the pressing jaw. This positioning provides a biting edge to hold the support ring 330 within the connection socket 310, also securing the inserted pipe 322 against slippage. After the tubular connection 300 is pressed, the support ring 330 continues to prevent leakage from the sealing portion 318. In the event that the tubular connection 300 experiences temperatures at or above the service temperature of the primary seal 350, the secondary seal 360a can begin to melt and flow. The second end 332b of the support ring 330 provides a barrier preventing the secondary seal from flowing too far past the primary sealing recess 318a. It will also be understood that the body 332 of the support ring 330 may be altered to increase drag against the inserted tube 322. These alterations may include, for example, knurling, light threading, machined bars, or any combination thereof.

Figure 4:
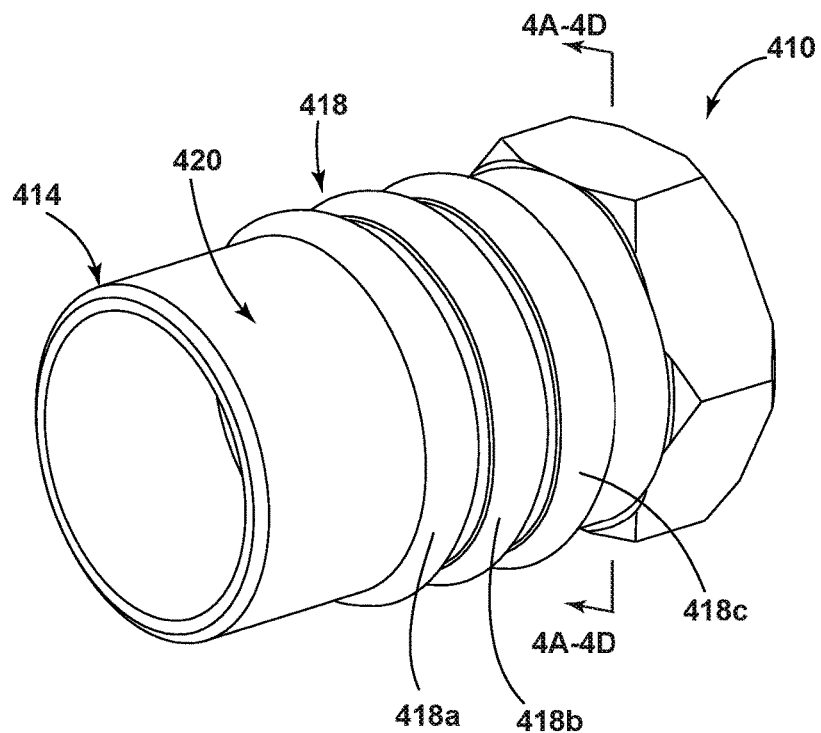
FIG. 4 is a perspective view of a connection socket with a secondary and a tertiary high-temperature seal, according to an embodiment.
Figure 4A:
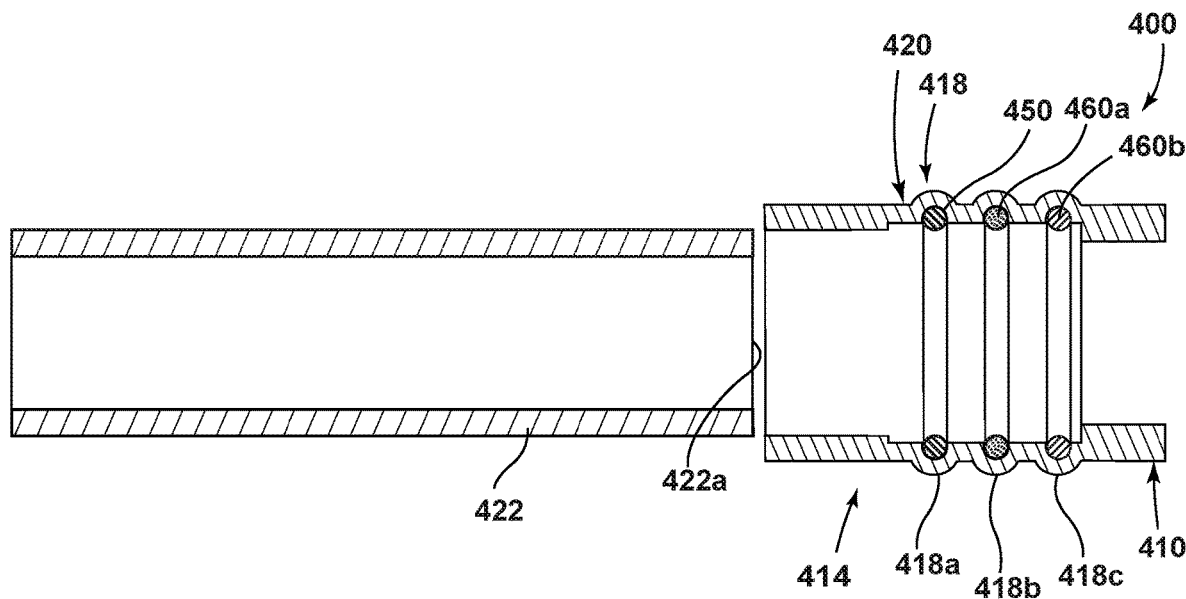
FIG. 4A is a cross-sectional view of the connection socket depicted in FIG. 4 and a pipe in a spaced apart configuration, according to an embodiment.
Figure 4B:
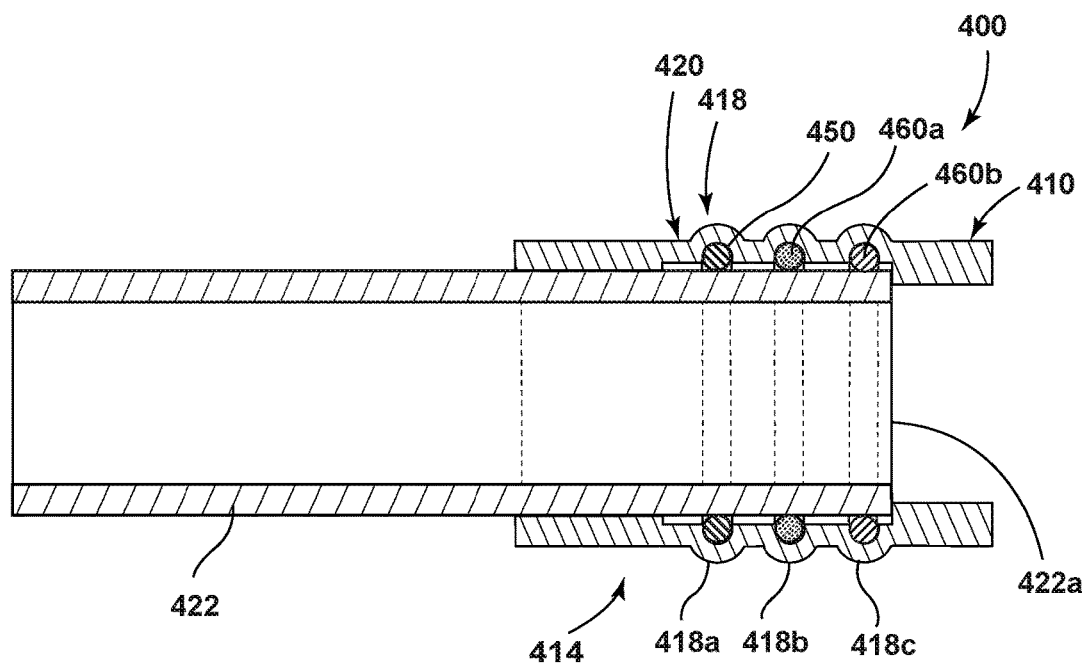
FIG. 4B is a cross-sectional view of the connection socket and pipe depicted in FIG. 4A, arranged together in a tubular connection according to an embodiment.
Figure 4C:
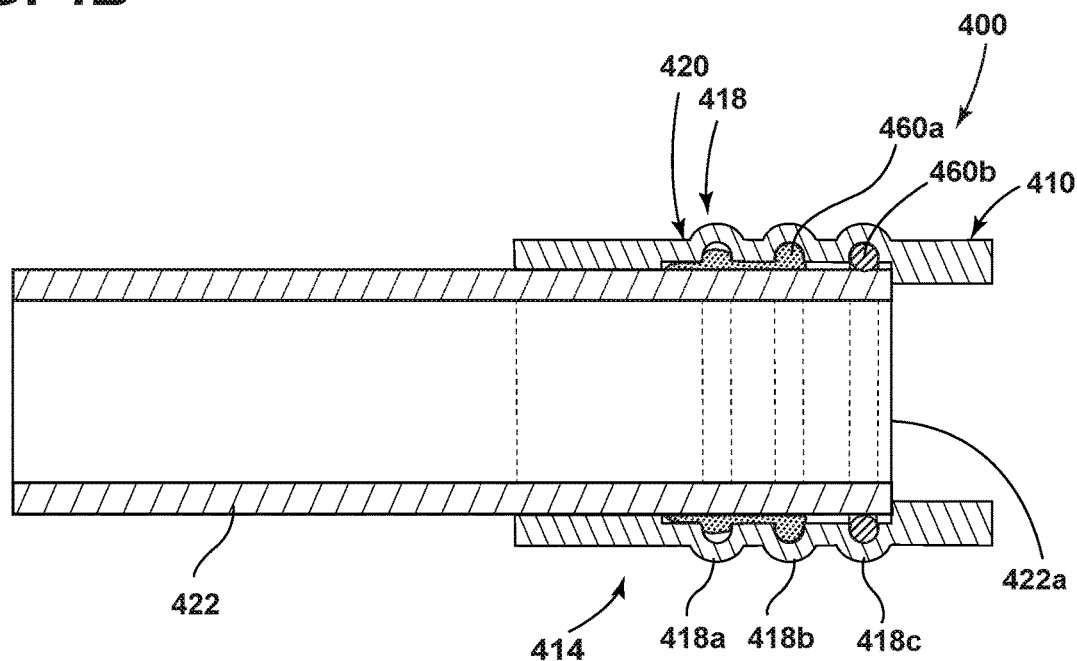
FIG. 4C is a cross-sectional view of the connection socket and pipe depicted in FIG. 4A, arranged together in a tubular connection with an as-wicked, secondary high-temperature seal, according to an embodiment.
Figure 4D:
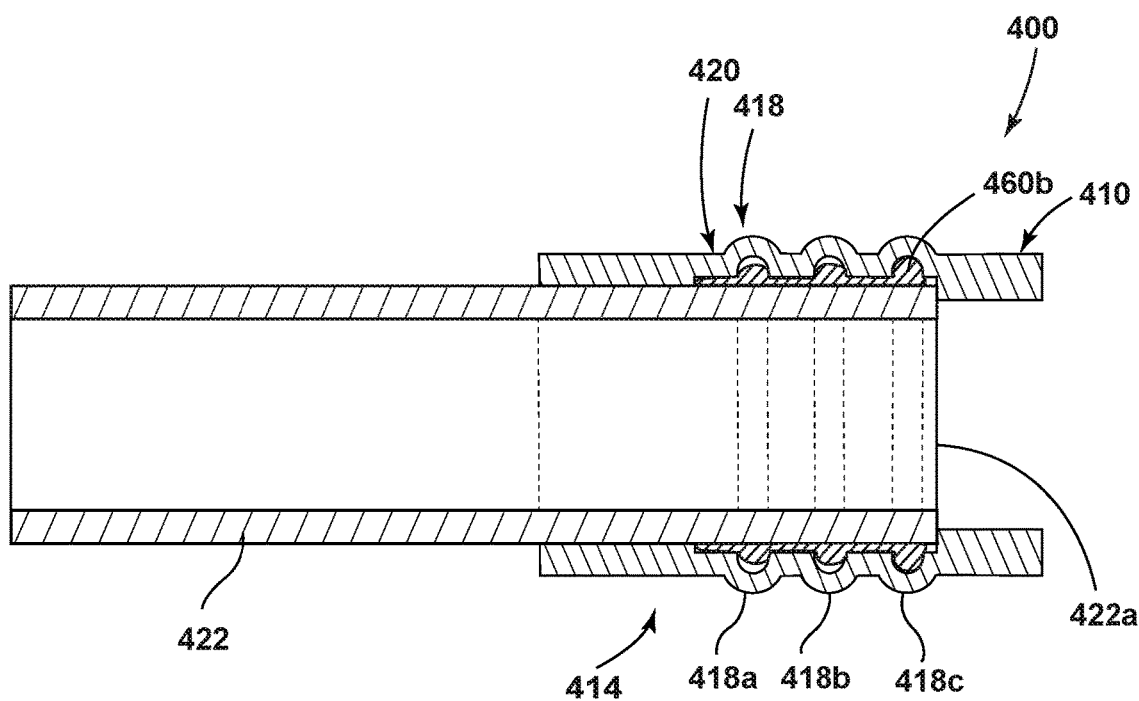
FIG. 4D is a cross-sectional view of the connection socket and pipe depicted in FIG. 4A, arranged together in a tubular connection with an as-wicked, tertiary high-temperature seal, according to an embodiment.

Referring now to FIGS. 4-4D, a connection socket 410 is depicted that can be employed in a tubular connection 400, according to another embodiment of the disclosure. Connection socket 410 and tubular connection 400 are similar to the connection socket 10 and tubular connection 100 (see FIGS. 1-1C), respectively, and like-numbered elements have the same or substantially similar functions and structures. The primary difference between the connection sockets and tubular connections is that the sockets 410 and connections 400 employ an additional tertiary seal 460b positioned within a tertiary sealing recess 418c. As depicted in exemplary form in FIGS. 4-4D, the connection socket 410 for a tubular connection 400 includes: a socket cup 414 having a metal alloy composition and a sealing portion 418. Further, the sealing portion 418 includes a primary sealing recess 418a, a secondary sealing recess 418b, and a tertiary sealing recess 418c. The sealing portion 418 also includes a primary seal 450 positioned within the primary sealing recess 418a, the primary seal 450 comprising an elastomeric material having a service temperature. Further, the sealing portion 418 includes a secondary seal 460a positioned within the secondary sealing recess 418b, the secondary seal 460a comprising a first metal composition. In addition, the sealing portion 418 includes a tertiary seal 460b positioned within the tertiary sealing recess 418c, the tertiary seal 460b comprising a second metal composition. The first and second metal compositions of the respective secondary and tertiary seals 460a, 460b may differ or may be the same, according to some embodiments. Further, each of the secondary seal and tertiary seals 460a, 460b has a melting temperature at or above the service temperature of the primary seal 450.

Referring again to FIGS. 4-4D, the tertiary sealing recess 418c and the tertiary seal 460b can be configured with differing or substantially similar structures, compositions and/or dimensions as compared to the respective secondary sealing recess 418b and secondary seal 460a outlined earlier. Advantageously, the connection socket 410 and tubular connection 400 is configured to allow for short-term leak protection during a high temperature or otherwise extreme temperature exposure. As noted earlier, the at least one secondary seal 460a (e.g., as positioned in the secondary sealing recess 418b) becomes active and serves as a temporary seal in the event of a fire or other extreme temperature event, taking over for or acting in synergy with a failed primary seal 450 (e.g., as positioned in the primary sealing recess 418a). As the primary seal 450 (see FIG. 4B) degrades or otherwise fails from exposure to temperatures at or above its service temperature, the secondary seal 460a, which is fabricated from a metal composition that melts at or above the service temperature of the primary seal 450, can begin to melt and flow. Upon flow and/or melting, the secondary seal 460a can flow into the primary sealing recess 418a, the secondary sealing recess 418b, and/or the gap between the outer diameter of the pipe 422 and the inner surface of the socket cup 414, as shown in FIG. 4C. Flow of the secondary seal 460a is facilitated by both capillary action afforded by the gap between the outer diameter of the pipe 422 and the inner surface of the socket cup 414, along with applied pressure from the media (e.g., gas) flowing within the pipe 422. After a period of time and/or a further increase in temperature, the secondary seal 460a within the primary and secondary sealing recesses 418a, 418b can also degrade, vaporize or otherwise fail. At this point, however, the seal may be maintained as the tertiary seal 460b can begin to melt and flow. Upon such melting and/or flow, the tertiary seal 460b can flow into the primary sealing recess 418a, secondary sealing recess 418b, the tertiary sealing recess 418c and/or the gap between the outer diameter of the pipe 422 and the inner surface of the socket cup 414, as shown in FIG. 4D. As with the secondary seal 460a, the flow of the tertiary seal 460b is facilitated by both capillary action afforded by the gap between the outer diameter of the pipe 422 and the inner surface of the socket cup 414, along with applied pressure from the media (e.g., gas) flowing within the pipe 422. Overall, the configuration of the connection socket 410 and tubular connection 400 provides an additional measure of high-temperature seal reliability by virtue of its secondary and tertiary seals 460a, 460b position within the secondary and tertiary sealing recesses 418b, 418c.

However, it is preferable to configure the secondary seal 460a and tertiary seal 460b such that their metal compositions differ such that their melting points and/or melting ranges likewise differ. In such implementations, the compositions and/or dimensions of the secondary and tertiary seals 460a, 460b can be selected to provide a larger temperature range and/or time duration for high-temperature seal reliability. It should also be understood that the concepts exemplified by the connection socket 410 and tubular connection 400 can be extended to additional configurations with multiple secondary and/or tertiary seals and sealing recesses. For example, a connection socket consistent with the socket 410 can be configured such that multiple secondary seals 460a with the same or differing metal compositions are placed into the secondary sealing recess 418b. As another example, a connection socket consistent with the socket 410 can be configured such that multiple tertiary sealing recesses 418c are present, each with a tertiary seal 460b having substantially the same or a differing metal composition.

In some embodiments of the connection socket 410 and tubular connection 400 depicted in FIGS. 4-4D, the primary, secondary and tertiary sealing recesses 418a, 418b, 418c are configured such that the secondary seal 460a and the tertiary seal 460b are positioned upstream of the primary seal 450 (i.e., closer to the pipe end 422a as shown in FIG. 4B). In other embodiments (not shown), the primary, secondary and tertiary sealing recesses 418a, 418b, 418c can be configured such that the secondary seal 460a and/or tertiary seal 460b are positioned downstream of the primary seal 450. It is also contemplated that the connection socket 410 and tubular connection 400 depicted in FIGS. 4-4D may be modified to include a support ring in a manner similar to the modifications shown in FIGS. 2-3C for the connection socket 10 and the tubular connection 100 of FIGS. 1-1C.

Figure 5:
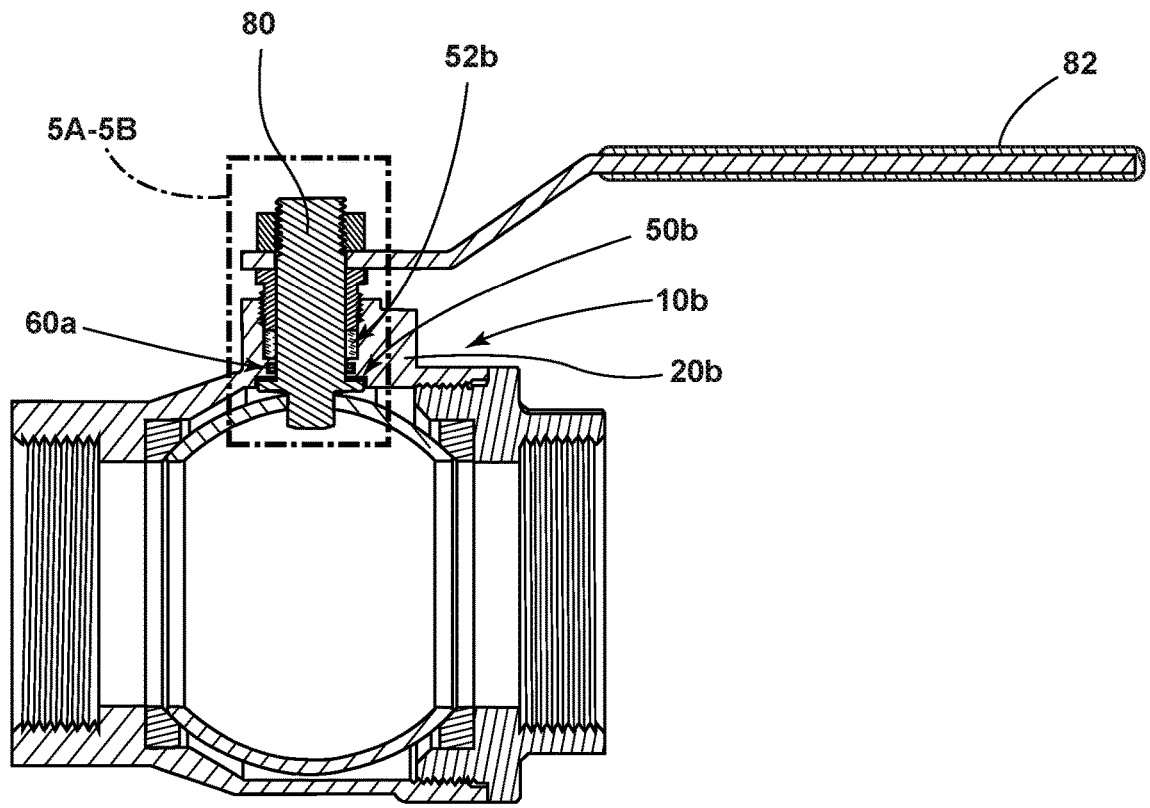
FIG. 5 is a cross-sectional view of a connection socket configured as a valve body for a valve assembly with a secondary high-temperature seal, according to an embodiment.
Figure 5A:
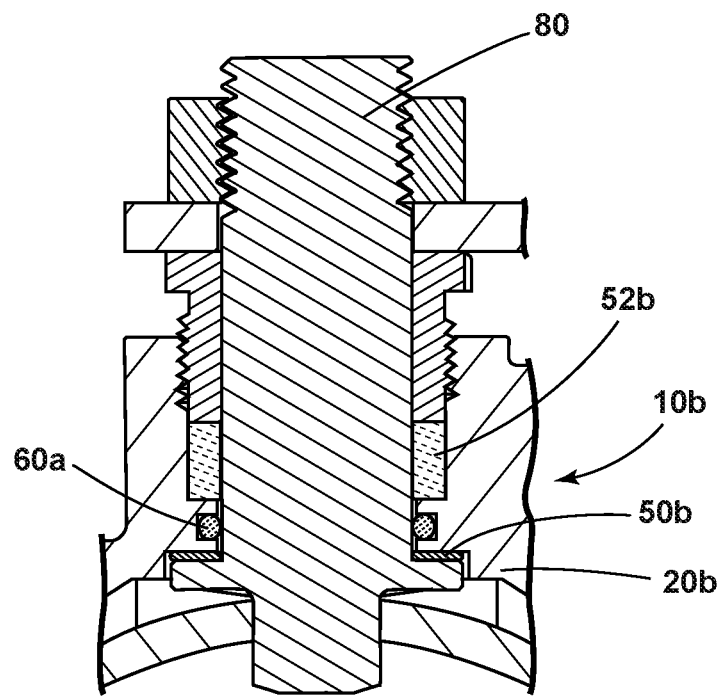
FIG. 5A is an enlarged view of the connection socket depicted in FIG. 5 at Section 5A.
Figure 5B:
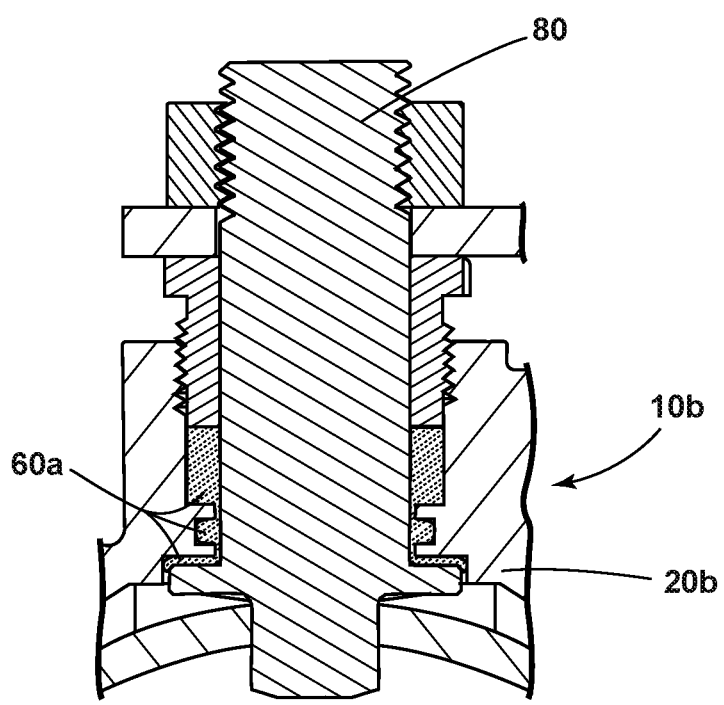
FIG. 5B is an enlarged view of the connection socket depicted in FIG. 5 at Section 5B, as configured with an as-wicked, secondary high-temperature seal.

Referring now to FIGS. 5-5B, a connection socket 10b is depicted that is configured as a valve body for a valve assembly with a secondary seal and a tertiary high-temperature seal, according to an embodiment. In general, connection socket 10b is similar in construction to the connection sockets 10, 210, 310, and 410 detailed earlier (see FIGS. 1-4D), and like-numbered elements have the same or substantially similar functions and structures. As shown, a socket cup 20b is in the form of a valve body suitable for a conventional valve assembly, and includes a stem 80 and a packing gland 52b. The stem 80, which can be coupled to a handle 82, and packing gland 52b are dimensioned, configured and constructed from conventional materials suitable to function and perform as a stem and packing gland in a valve body and valve assembly, as understood by those with ordinary skill in the field of this disclosure. Further, the connection socket 10b includes a primary seal 50b in the form of a gasket that seals the stem 80; and a secondary seal 60a that is positioned in proximity to the packing gland 52b and the primary seal 50b (i.e., a gasket). In some embodiments, an additional tertiary seal (not shown) can also be positioned in proximity to the packing gland 52b and the primary seal 50b.

Referring again to FIGS. 5-5B, the primary seal 50b in the form of a gasket, and the packing gland 52b, are generally constructed of materials, e.g., polymeric materials, with a service temperature that does not exceed 500° F. In embodiments, the primary seal 50b and the packing gland 52b are fabricated from materials that are substantially equivalent to those employed in the primary seal 50 of the connection sockets 10, 210, 310, and 410 (see FIGS. 1-4D). Similarly, the secondary seal 60a (and tertiary seal, if present) are fabricated from metal compositions that are the same as or substantially similar to the materials employed in the secondary and tertiary seals 60a, 260a, 360a, and 460a and 460b employed in the connection sockets 10, 210, 310, 410 outlined earlier in the disclosure (see FIGS. 1-4D).

Still referring to FIGS. 5-5B, the connection socket 10b (e.g., in the form of the valve body for use in valve assembly) is advantageously configured to allow for short-term leak protection during a high temperature or otherwise extreme temperature exposure. As noted earlier, the connection socket 10b is configured with at least one secondary seal 60a (e.g., as positioned between the packing gland 52b and the primary seal 50b in the form of a gasket) that becomes active and serves as a temporary seal in the event of a fire or other extreme temperature event, taking over for or acting in synergy with a failed primary seal 50b and/or packing gland 52b. As the primary seal 50b and/or the packing gland 52b (see FIGS. 5, 5A) degrade or otherwise fail from exposure to temperatures at or above their service temperature, the secondary seal 60a (and optional tertiary seal, not shown), which is fabricated from a metal composition that melts at or above the service temperature of the primary seal 50b and packing gland 52b, can begin to melt and flow. Upon flow and/or melting, the secondary seal 60a (and optional tertiary seal, not shown) can flow into the regions formerly occupied by the primary seal 50b, the packing gland 52b and/or the gap between the outer diameter of the stem 80 and the inner surface of the socket cup 20b, as shown in FIG. 5B. Flow of the secondary seal 60a (and optional tertiary seal, not shown) is facilitated by both capillary action afforded by the gap between the outer diameter of the stem 80 and the inner surface of the socket cup 20b, along with applied pressure from the media (e.g., gas) flowing within the socket cup 20b (e.g., configured as a valve body).

EXAMPLES

The following example represents certain non-limiting embodiments of the disclosure.

Figure 6A:
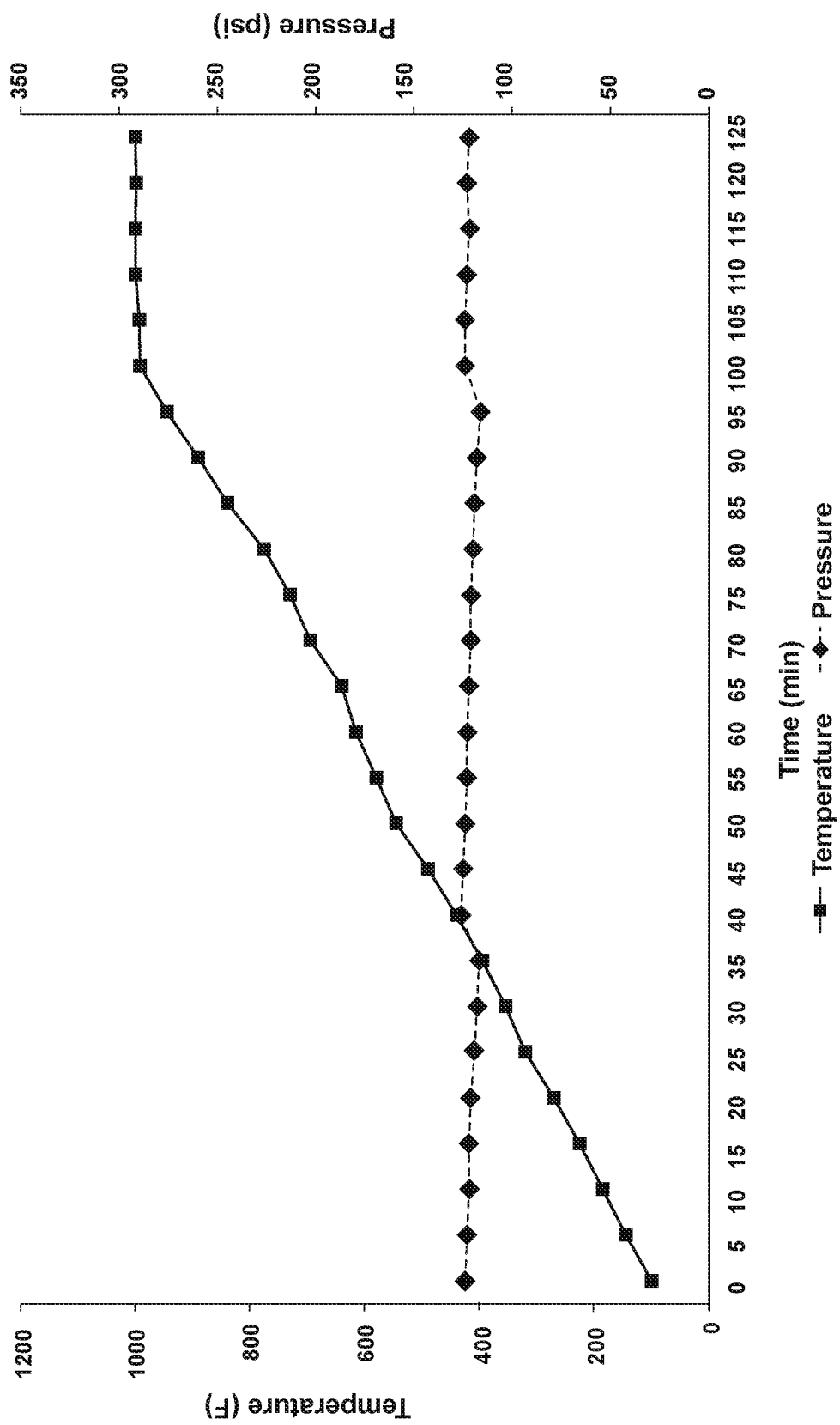
FIG. 6A is a graph of temperature and pressure versus time from a first oven and pressure testing protocol conducted on a tubular connection with a high temperature seal that includes a connection socket made of carbon steel that is mechanically joined to a black iron pipe, according to an embodiment.

Referring now to FIG. 6A, the graph depicts oven temperature testing of a tubular connection (e.g., as comparable to a tubular connection 100 as shown in FIGS. 1-1C) that includes a connection socket made of carbon steel (e.g., as comparable to connection socket 10 as shown in FIGS. 1-1C) that is mechanically joined to a black iron pipe (e.g., as comparable to pipe 22 shown in FIGS. 1-1C). As evidenced by the data in FIG. 6A, the tubular connection maintained a pressure of at least about 120 psi with no leaks for at least 25 minutes at a temperature of about 1000° F. (i.e., from time=100 minutes to time=125 minutes). While not shown in FIG. 6A, the oven test was continued after a time of 125 minutes in an unobserved state, and a leak occurred sometime before an additional 120 minutes on test. More particularly, the data in FIG. 6A shows that the internal assembly pressure was maintained at about 120 psi for 1½ hours (95 minutes) as the oven temperature increased to 1,000° F. The pressure remained stable at least to the last point of oven monitoring, at a test duration of 125 minutes.

The materials employed in the components tested to generate the data in FIG. 6A were as follows: a socket body made of carbon steel (1020 Grade); a black iron pipe (e.g., comparable to pipe 22 as shown in FIGS. 1-1C) an alloy ring (e.g., as comparable to the secondary seal 60a as shown in FIGS. 1-1C) made of standard lead-free 95-5 solder with a melting range between about 450° F. to about 464° F.; and a primary seal (an O-ring) made of peroxide-cured EPDM with a service temperature of about 300° F. (e.g., as comparable to the primary seal 50 shown in FIGS. 1-1C). In this demonstration, the black iron piping was inserted and pressed within the carbon steel cap socket by a conventional press-fitting tool. The assembly was then pressurized with argon gas. The internal pressure of the assembly was monitored to ensure no leaks occurred at ambient temperature as the pressure was increased to at least 80 psi. The assembly was then placed in an oven with temperature raised to 1,000° F. and pressure was continuously monitored.

As demonstrated by the data in FIG. 6A, the design of the tested connection socket, combined with the selection of the ring alloy material, was intended to allow for the alloy ring to melt at or before the time in which the primary O-ring degraded and leaked. The secondary metal ring melted as the temperature increased within the oven. The molten ring metal was then drawn by both capillary action and internal assembly pressure into the gap between the black iron pipe and the carbon steel press socket. This liquid metal then provided a pressure seal as it progressed into the space formerly occupied by the O-ring and/or interacted with the O-ring as it degraded and burned away.

Figure 6B:
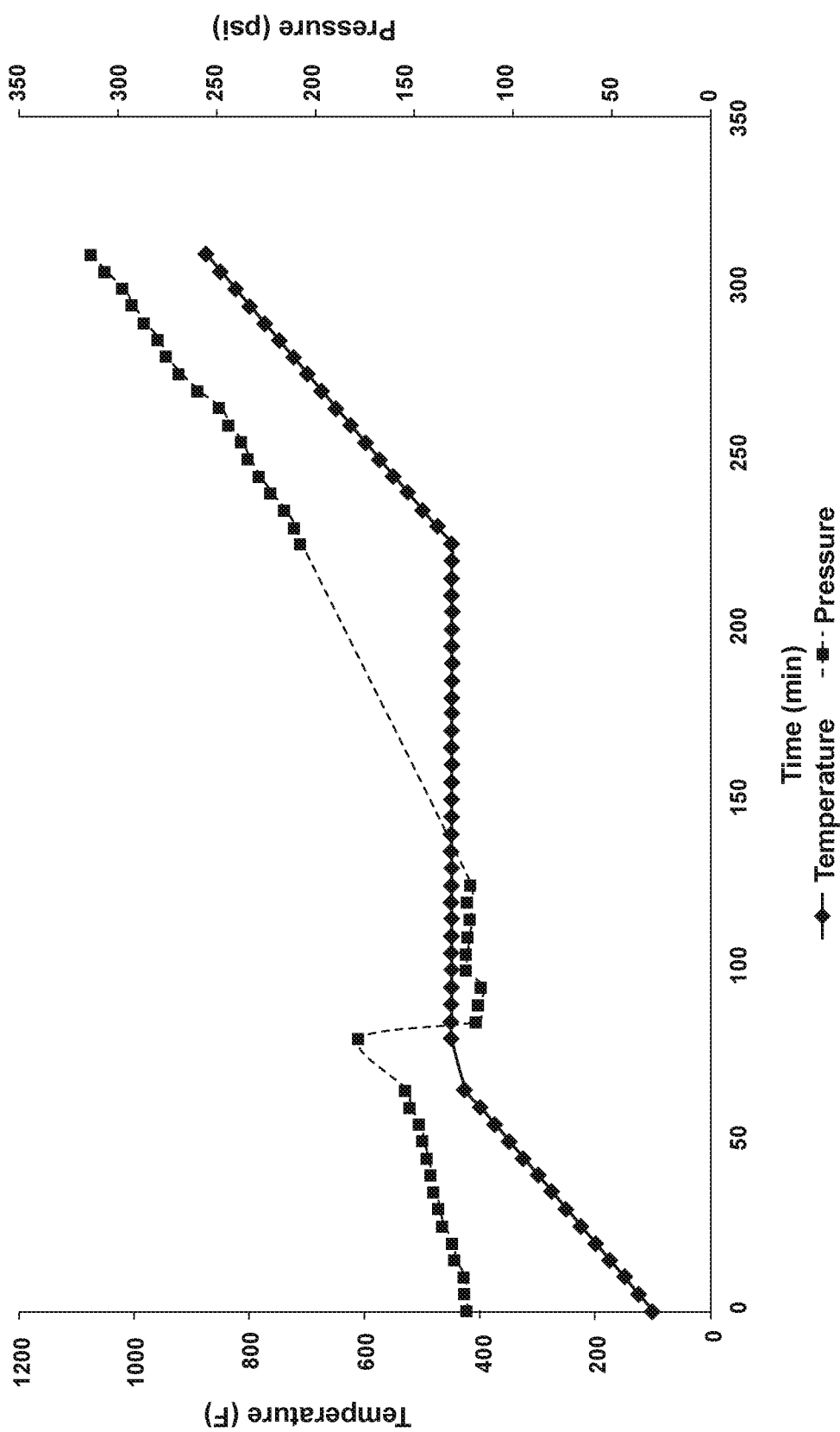
FIG. 6B is a graph of temperature and pressure versus time from a second oven and pressure testing protocol, as conducted on the same tubular connection configuration tested as depicted in FIG. 6A, according to an embodiment.

Referring now to FIG. 6B, the same tubular connection tested earlier to generate the data in FIG. 6A was tested again with a different pressure and temperature protocol. As evidenced by the data in FIG. 6B, the tubular connection maintained a pressure of at least about 280 psi with no leaks for at least 25 minutes at a temperature of about 750° F. or greater (i.e., from time=285 minutes to time=310 minutes). After the tubular connection was pressurized with argon gas, the internal pressure of the assembly was monitored to ensure no leaks occurred at ambient temperature. The tubular connection was then placed into an oven, and then pressure was increased from ambient pressure to over 300 psi as the temperature was increased from about 100° F. to about 875° F. Pressure was then continuously monitored to detect the presence of any leaks.

Figure 7:
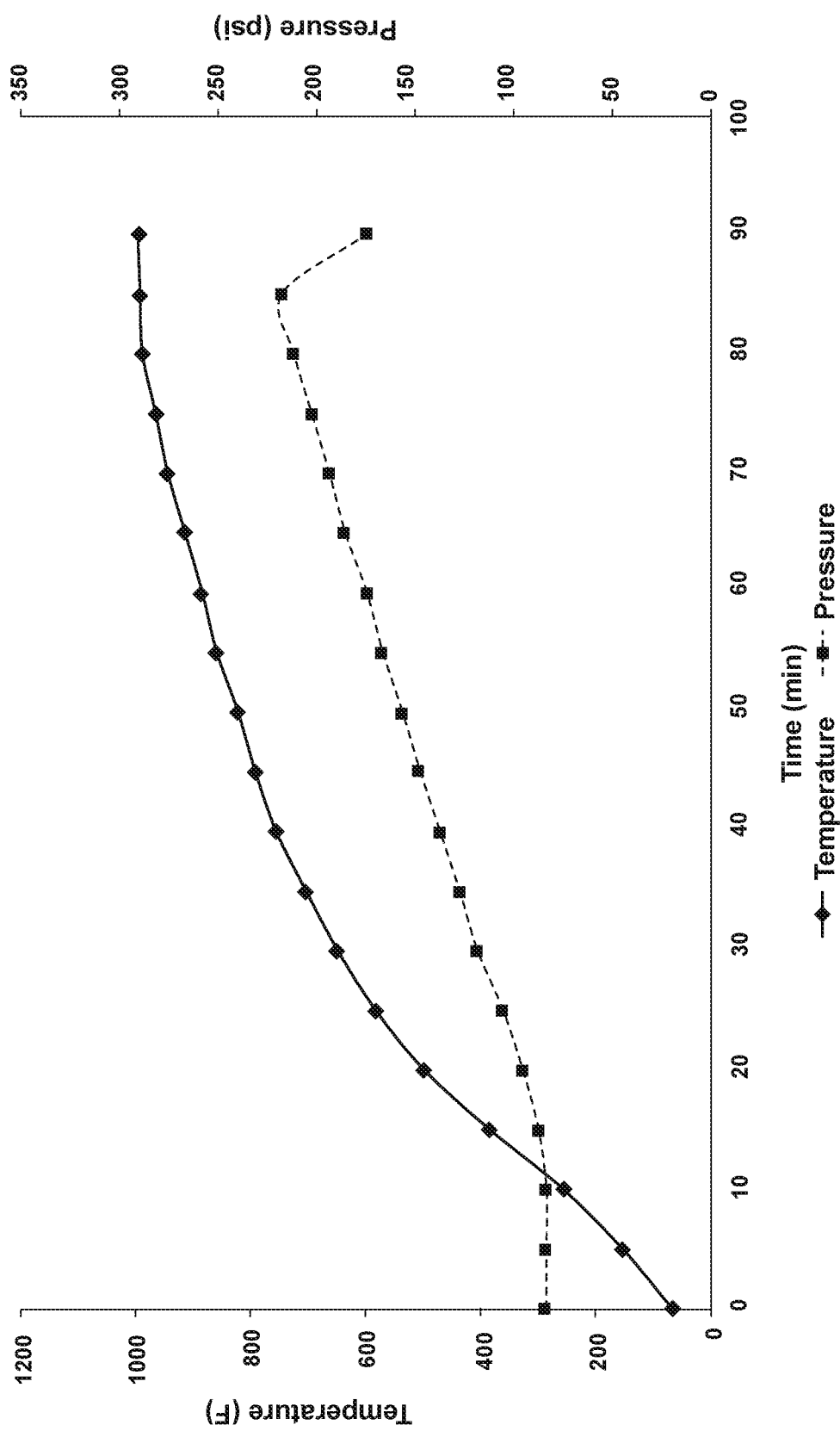
FIG. 7 is a graph of temperature and pressure versus time from a third oven and pressure testing protocol conducted on a tubular connection with a high temperature seal that includes a connection socket made of a copper alloy that is mechanically joined to a copper alloy pipe, according to an embodiment.

Referring now to FIG. 7, the concept of the high temperature secondary seal was also demonstrated with two 2" copper caps (e.g., indicative of a connection socket 10 as shown in FIGS. 1-1C) with a secondary seal (in the form of a ring) placed at a recess formed at the very end of the tube. The materials employed in the components tested to generate the data in FIG. 7 were as follows: a socket body made of copper (i.e., copper grade 122 alloy); a copper tube (e.g., comparable to pipe 22 as shown in FIGS. 1-1C); an alloy ring (e.g., as comparable to the secondary seal 60a as shown in FIGS. 1-1C) made of standard lead-free 95-5 solder with a melting range between about 450° F. to about 464° F.; and a primary seal (an O-ring) made of peroxide-cured EPDM having a service temperature of about 300° F. (e.g., as comparable to the primary seal 50 shown in FIGS. 1-1C).

These trials were conducted to access the effect of high temperature exposure on the copper socket, primary O-ring, and the secondary seal. As evidenced by the data in FIG. 7, one of the tubular connections was able to maintain the 1,000° F. target for about 5 minutes before a leak occurred (i.e., as evidenced by the loss in pressure from between a time of 85 minutes and 90 minutes). As is evident from the data shown in FIG. 7, the use of a secondary ring (e.g., the secondary seal 60a as shown in FIGS. 1-1C) proved effective in significantly increasing the high temperature performance of the O-ring seal (e.g., the primary seal 50). The leak path that was discovered on the failed connection socket surfaces showed that solder from the alloy ring had leaked in the location formerly occupied by the O-ring, at the points of final closure of the die/tool employed to press fit the copper socket over the copper tube. Hence, the rubber of the primary seal had "bunched up" in this area, leaving a wider gap than for the remainder of the O-ring.

According to a first aspect, a connection socket for a tubular connection is provided that comprises a socket cup having a metal alloy composition and a sealing portion, the sealing portion comprising a primary sealing recess and a secondary sealing recess, a primary seal positioned within the primary sealing recess, the primary seal comprising an elastomeric material having a service temperature, and a secondary seal positioned within the secondary sealing recess, the secondary seal comprising a metal composition. The secondary seal has a melting temperature at or above the service temperature of the primary seal.

According to a second aspect, the socket according to the first aspect is provided, wherein the secondary seal is positioned upstream of the primary seal.

According to a third aspect, the socket according to the first or second aspect is provided, wherein the socket cup comprises an internal threading positioned downstream of the primary seal and the secondary seal, and further wherein internal threading is configured to mate with an external threading of the support ring.

According to a fourth aspect, the socket according to the first or second aspect is provided, wherein the socket cup comprises an inner surface defining a channel positioned downstream of the primary seal and the secondary seal, and further wherein the channel is configured to mate with a protrusion of a support ring.

According to a fifth aspect, the socket according to any one of the first through fourth aspects is provided, wherein the secondary seal comprises a brazing alloy or a solder alloy composition.

According to a sixth aspect, the socket according to the first through fifth aspects is provided, wherein the primary seal comprises an elastomeric material selected from the group consisting of a silicone rubber, a nitrile rubber, an ethylene propylene diene monomer (EPDM) rubber, a fluorocarbon-based rubber, a fluorosilicone rubber, and a polytetrafluoroethylene (PTFE) material.

According to a seventh aspect, the socket according to the first aspect is provided, wherein the socket cup is configured as a valve body for a valve assembly comprising a stem and a packing gland, wherein the primary seal is a gasket configured for sealing the stem, and further wherein the secondary seal is positioned in proximity to the packing gland and the gasket.

According to an eighth aspect, a connection socket for a tubular connection is provided that comprises a socket cup having a metal alloy composition and a sealing portion, the sealing portion comprises a primary sealing recess, a secondary sealing recess, and a tertiary sealing recess, a primary seal positioned within the primary sealing recess, a secondary seal positioned within the secondary sealing recess, and a tertiary seal positioned within the tertiary sealing recess. The primary seal comprises an elastomeric material having a service temperature. The secondary seal comprises a first metal composition, and the tertiary seal comprises a second metal composition. The first and second metal compositions of the respective secondary and tertiary seals differ, and each of the secondary and tertiary seals has a melting temperature at or above the service temperature of the primary seal.

According to a ninth aspect, the connection socket according to the eighth aspect is provided, wherein the secondary and tertiary seals are positioned upstream of the primary seal.

According to a tenth aspect, the connection socket according to the eighth or ninth aspect is provided, wherein the socket cup comprises an internal threading positioned downstream of the primary seal and the secondary seal, and further wherein internal threading is configured to mate with an external threading of the support ring.

According to a eleventh aspect, the connection socket according to the eighth or ninth aspect is provided, wherein the socket cup comprises an inner surface defining a channel positioned downstream of the primary seal and the secondary seal, and further wherein the channel is configured to mate with a protrusion of a support ring.

According to a twelfth aspect, the connection socket according to the eighth through eleventh aspects is provided, wherein the secondary seal and the tertiary seal each comprises a brazing alloy or a solder alloy composition.

According to a thirteenth aspect, the connection socket according to the eighth through twelfth aspects is provided, wherein the primary seal comprises an elastomeric material selected from the group consisting of a silicone rubber, a nitrile rubber, an ethylene propylene diene monomer (EPDM) rubber, a fluorocarbon-based rubber, a fluorosilicone rubber, and a polytetrafluoroethylene (PTFE) material.

According to a fourteenth aspect, the connection socket according to the eighth aspect is provided, wherein the socket cup is configured as a valve body for a valve assembly comprising a stem and a packing gland, wherein the primary seal is a gasket configured for sealing the stem, and further wherein the secondary and tertiary seals are positioned in proximity to the packing gland and the gasket.

According to a fifteenth aspect, a tubular connection is provided that comprises a socket cup having a metal alloy composition and a sealing portion, the sealing portion comprises a primary and a secondary sealing recess, a primary seal positioned within the primary sealing recess, a secondary seal positioned within the secondary sealing recess, and a pipe having a metal alloy composition and comprising a pipe end in contact with the primary seal and the secondary seal. The primary seal comprises an elastomeric material having a service temperature, and the secondary seal comprises a metal composition. The secondary seal has a melting temperature at or above the service temperature of the primary seal, and the pipe end in contact with the primary seal and the secondary seal defines a barrier to media flowing through the pipe.

According to a sixteenth aspect, the tubular connection according to the fifteenth aspect is provided, wherein the tubular connection further comprises a support ring received by the socket cup, wherein the support ring comprises a ring lip positioned to be flush with an outer lip of the socket cup.

According to a seventeenth aspect, the tubular connection according to the fifteenth or sixteenth aspect is provided, wherein the socket cup comprises an internal threading positioned downstream of the primary seal and the secondary seal, and further wherein the support ring comprises an external threading mated with the internal threading of the socket cup.

According to an eighteenth aspect, the tubular connection according to the fifteenth or sixteenth aspect is provided, wherein the socket cup comprises an inner surface defining a channel positioned downstream of the primary seal and the secondary seal, and further wherein the support ring is a split support ring that comprises a protrusion that is received by the channel of the socket cup.

According to a nineteenth aspect, the tubular connection according to the fifteenth through eighteenth aspects is provided, wherein the secondary seal comprises a brazing alloy or a solder alloy composition.

According to a twentieth aspect, the tubular connection according to the fifteenth through nineteenth aspects is provided, wherein the primary seal comprises an elastomeric material selected from the group consisting of a silicone rubber, a nitrile rubber, an ethylene propylene diene monomer (EPDM) rubber, a fluorocarbon-based rubber, a fluorosilicone rubber, and a polytetrafluoroethylene (PTFE) material.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A connection socket for a tubular connection, comprising:
   a socket cup having a metal alloy composition and a sealing portion, the sealing portion comprising a primary sealing recess and a secondary sealing recess;
   a primary seal positioned within the primary sealing recess, the primary seal comprising an elastomeric material having a service temperature; and
   a secondary seal positioned within the secondary sealing recess, the secondary seal comprising a metal composition,
   wherein the secondary seal has a melting temperature at or above the service temperature of the primary seal, and
   wherein the socket cup is configured as a valve body for a valve assembly comprising a stem and a packing gland, wherein the primary seal is a gasket configured for sealing the stem, and further wherein the secondary seal is positioned in proximity to the packing gland and the gasket.

2. The socket according to claim 1, wherein the secondary seal is positioned upstream of the primary seal.

3. The socket according to claim 1, wherein the socket cup comprises an internal threading positioned downstream of the primary seal and the secondary seal, and further wherein internal threading is configured to mate with an external threading of a support ring.

4. The socket according to claim 1, wherein the socket cup comprises an inner surface defining a channel positioned downstream of the primary seal and the secondary seal, and further wherein the channel is configured to mate with a protrusion of a support ring.

5. The socket according to claim 1, wherein the secondary seal comprises a brazing alloy or a solder alloy composition.

6. The socket according to claim 5, wherein the primary seal comprises an elastomeric material selected from the group consisting of a silicone rubber, a nitrile rubber, an ethylene propylene diene monomer (EPDM) rubber, a fluorocarbon-based rubber, a fluorosilicone rubber, and a polytetrafluoroethylene (PTFE) material.

7. A connection socket for a tubular connection, comprising:
   a socket cup having a metal alloy composition and a sealing portion, the sealing portion comprises a primary sealing recess, a secondary sealing recess, and a tertiary sealing recess;
   a primary seal positioned within the primary sealing recess, the primary seal comprising an elastomeric material having a service temperature;
   a secondary seal positioned within the secondary sealing recess, the secondary seal comprising a first metal composition; and
   a tertiary seal positioned within the tertiary sealing recess, the tertiary seal comprising a second metal composition,
   wherein the first and second metal compositions of the respective secondary and tertiary seals differ, and
   further wherein each of the secondary and tertiary seals has a melting temperature at or above the service temperature of the primary seal.

8. The socket according to claim 7, wherein the secondary and tertiary seals are positioned upstream of the primary seal.

9. The socket according to claim 7, wherein the socket cup comprises an internal threading positioned downstream of the primary seal and the secondary seal, and further wherein internal threading is configured to mate with an external threading of a support ring.

10. The socket according to claim 7, wherein the socket cup comprises an inner surface defining a channel positioned downstream of the primary seal and the secondary seal, and further wherein the channel is configured to mate with a protrusion of a support ring.

11. The socket according to claim 7, wherein the secondary seal and the tertiary seal each comprises a brazing alloy or a solder alloy composition.

12. The socket according to claim 11, wherein the primary seal comprises an elastomeric material selected from the group consisting of a silicone rubber, a nitrile rubber, an ethylene propylene diene monomer (EPDM) rubber, a fluorocarbon-based rubber, a fluorosilicone rubber, and a polytetrafluoroethylene (PTFE) material.

13. The socket according to claim 7, wherein the socket cup is configured as a valve body for a valve assembly comprising a stem and a packing gland, wherein the primary seal is a gasket configured for sealing the stem, and further wherein the secondary and tertiary seals are positioned in proximity to the packing gland and the gasket.

14. A tubular connection, comprising:
   a socket cup having a metal alloy composition and a sealing portion, the sealing portion comprises a primary and a secondary sealing recess;
   a primary seal positioned within the primary sealing recess, the primary seal comprising an elastomeric material having a service temperature;
   a secondary seal positioned within the secondary sealing recess, the secondary seal comprising a metal composition; and
   a pipe having a metal alloy composition and comprising a pipe end in contact with the primary seal and the secondary seal,
   wherein the secondary seal has a melting temperature at or above the service temperature of the primary seal, wherein the pipe end in contact with the primary seal and the secondary seal defines a barrier to media flowing through the pipe, and further wherein the socket cup is configured as a valve body for a valve assembly comprising a stem and a packing gland, wherein the primary seal is a gasket configured for sealing the stem, and further wherein the secondary seal is positioned in proximity to the packing gland and the gasket.

15. The tubular connection according to claim 14, further comprising:

a support ring received by the socket cup, wherein the support ring comprises a ring lip positioned to be flush with an outer lip of the socket cup.

16. The tubular connection according to claim 15, wherein the socket cup comprises an internal threading positioned downstream of the primary seal and the secondary seal, and further wherein the support ring comprises an external threading mated with the internal threading of the socket cup.

17. The tubular connection according to claim 15, wherein the socket cup comprises an inner surface defining a channel positioned downstream of the primary seal and the secondary seal, and further wherein the support ring is a split support ring that comprises a protrusion that is received by the channel of the socket cup.

18. The tubular connection according to claim 14, wherein the secondary seal comprises a brazing alloy or a solder alloy composition.

19. The tubular connection according to claim 18, wherein the primary seal comprises an elastomeric material selected from the group consisting of a silicone rubber, a nitrile rubber, an ethylene propylene diene monomer (EPDM) rubber, a fluorocarbon-based rubber, a fluorosilicone rubber, and a polytetrafluoroethylene (PTFE) material.

20. A connection socket for a tubular connection, comprising:

a socket cup having a metal alloy composition and a sealing portion, the sealing portion comprising a primary sealing recess and a secondary sealing recess, wherein a single primary seal is positioned in the primary sealing recess, the primary seal comprising an elastomeric material having a service temperature, wherein a single secondary seal is positioned in the secondary sealing recess, the secondary seal comprising a metal composition, wherein the secondary seal has a melting temperature at or above the service temperature of the primary seal and between about 316° C. and 538° C., wherein the socket cup and the secondary seal are configured to facilitate flow of the secondary seal upon melting into the primary sealing recess, and wherein the secondary seal comprises a brazing alloy or a solder alloy composition.

* * * * *